United States Patent
Park et al.

(10) Patent No.: US 11,782,596 B2
(45) Date of Patent: Oct. 10, 2023

(54) APPARATUS AND METHOD FOR PROVIDING CONTENT SEARCH USING KEYPAD IN ELECTRONIC DEVICE

(71) Applicant: Samsung Electronics Co., Ltd., Gyeonggi-do (KR)

(72) Inventors: Chunbae Park, Gyeonggi-do (KR); Taekyoung Kim, Gyeonggi-do (KR); Joonhwan Jeon, Gyeonggi-do (KR); Sangheon Kim, Gyeonggi-do (KR); Yongseok Jang, Gyeonggi-do (KR); Dami Jeon, Gyeonggi-do (KR); Changjin Jeong, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/490,064

(22) Filed: Sep. 30, 2021

(65) Prior Publication Data

US 2022/0043568 A1    Feb. 10, 2022

Related U.S. Application Data

(63) Continuation of application No. PCT/KR2021/009575, filed on Jul. 23, 2021.

(30) Foreign Application Priority Data

Jul. 23, 2020    (KR) ........................ 10-2020-0091574

(51) Int. Cl.
*G06F 3/04886*    (2022.01)
*G06F 3/0482*    (2013.01)
(Continued)

(52) U.S. Cl.
CPC ........ *G06F 3/04886* (2013.01); *G06F 3/0237* (2013.01); *G06F 3/0482* (2013.01); *G06F 3/0485* (2013.01)

(58) Field of Classification Search
CPC .. G06F 3/04886; G06F 3/0237; G06F 3/0482; G06F 3/0485; G06F 3/0236
See application file for complete search history.

(56) References Cited

U.S. PATENT DOCUMENTS

| | | | |
|---|---|---|---|
| 5,808,914 A * | 9/1998 | Shin ...................... | G06F 40/177 703/2 |
| 6,603,493 B1 * | 8/2003 | Lovell .................... | G06F 9/451 345/660 |

(Continued)

FOREIGN PATENT DOCUMENTS

| | | |
|---|---|---|
| KR | 10-2012-0050216 A | 5/2012 |
| KR | 10-2014-0120972 A | 10/2014 |

(Continued)

OTHER PUBLICATIONS

International Search Report dated Oct. 19, 2021.

*Primary Examiner* — Ryan F Pitaro
(74) *Attorney, Agent, or Firm* — Cha & Reiter, LLC

(57) ABSTRACT

Various embodiments of the disclosure provide a method and apparatus for performing a content search using a keypad (or a keyboard) in an electronic device. The electronic device according to various embodiments include a display; a wireless communication circuit; a memory; and a processor. The processor may be configured to: display an execution screen of an application; detect a first input for calling a keypad; display the keypad on the execution screen; detect a second input for a smart search while displaying the keypad; request a content search from at least one application of the electronic device; and display a search (Continued)

result searched by the at least one application through the keypad. Other embodiments are possible.

15 Claims, 30 Drawing Sheets

(51) Int. Cl.
*G06F 3/0485* (2022.01)
*G06F 3/023* (2006.01)

(56) References Cited

U.S. PATENT DOCUMENTS

| | | | |
|---|---|---|---|
| 9,939,962 | B2 | 4/2018 | Gnedin et al. |
| 10,133,704 | B2* | 11/2018 | Kota ................. G06F 40/103 |
| 2007/0168859 | A1* | 7/2007 | Fortes ................ G06F 40/103 |
| | | | 715/700 |
| 2008/0168366 | A1 | 7/2008 | Kocienda et al. |
| 2013/0027227 | A1* | 1/2013 | Nordstrom ........ G01C 21/3438 |
| | | | 340/990 |
| 2013/0055055 | A1* | 2/2013 | Turcotte .............. G06F 9/451 |
| | | | 715/201 |
| 2013/0061166 | A1* | 3/2013 | Seo ................... G06F 3/0488 |
| | | | 715/780 |
| 2014/0310627 | A1 | 10/2014 | Kim |
| 2014/0358958 | A1* | 12/2014 | Mandic .............. G06F 16/951 |
| | | | 707/769 |
| 2014/0365950 | A1 | 12/2014 | Jegal et al. |
| 2016/0026356 | A1* | 1/2016 | Persaud ............. G06F 3/0485 |
| | | | 715/212 |
| 2016/0103564 | A1* | 4/2016 | Chao ................ G06F 3/04886 |
| | | | 715/825 |
| 2016/0132234 | A1* | 5/2016 | Riscutia ............. G06F 3/0483 |
| | | | 715/773 |
| 2016/0188719 | A1* | 6/2016 | Glover .............. G06Q 30/0261 |
| | | | 707/706 |
| 2017/0102871 | A1* | 4/2017 | Won .................. G06F 3/04886 |
| 2017/0300462 | A1* | 10/2017 | Cudworth ........... G06F 3/0237 |
| 2017/0357521 | A1* | 12/2017 | Paek ................. G06F 3/04886 |
| 2017/0359279 | A1* | 12/2017 | Peterson ............ H04L 63/0428 |
| 2018/0039406 | A1* | 2/2018 | Kong ................... G06F 9/451 |
| 2018/0075254 | A1* | 3/2018 | Reid ..................... G06F 7/00 |
| 2018/0352393 | A1* | 12/2018 | Lottermoser .......... G06F 9/5005 |
| 2019/0073412 | A1* | 3/2019 | Ranganathan ...... G06F 16/9035 |
| 2019/0235714 | A1* | 8/2019 | Bilange ............... G06F 3/0482 |
| 2019/0265886 | A1 | 8/2019 | Moon |
| 2019/0332612 | A1* | 10/2019 | Glover .............. G06Q 30/0623 |
| 2020/0057823 | A1* | 2/2020 | McCarty ............ G06F 3/0482 |
| 2020/0363949 | A1* | 11/2020 | Gnedin ................ H04L 67/14 |
| 2022/0066623 | A1* | 3/2022 | Tung ................. G06F 3/0482 |
| 2022/0092071 | A1* | 3/2022 | McIntosh ........... G06F 16/532 |
| 2022/0303736 | A1* | 9/2022 | Glover ................ H04W 4/029 |

FOREIGN PATENT DOCUMENTS

| | | |
|---|---|---|
| KR | 10-2014-0143556 A | 12/2014 |
| KR | 10-2018-0087608 A | 8/2018 |
| KR | 10-2019-0101643 A | 9/2019 |

* cited by examiner

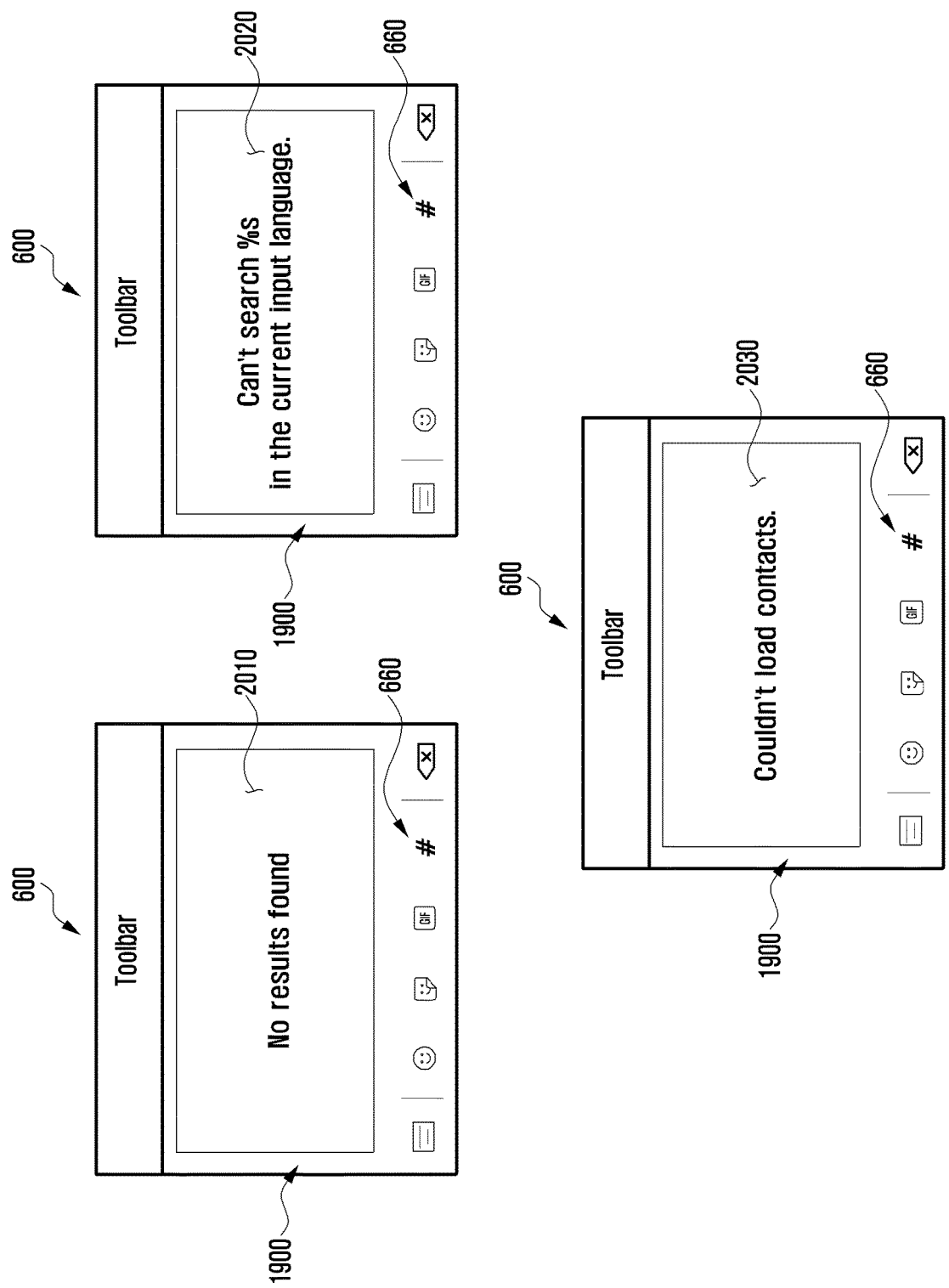

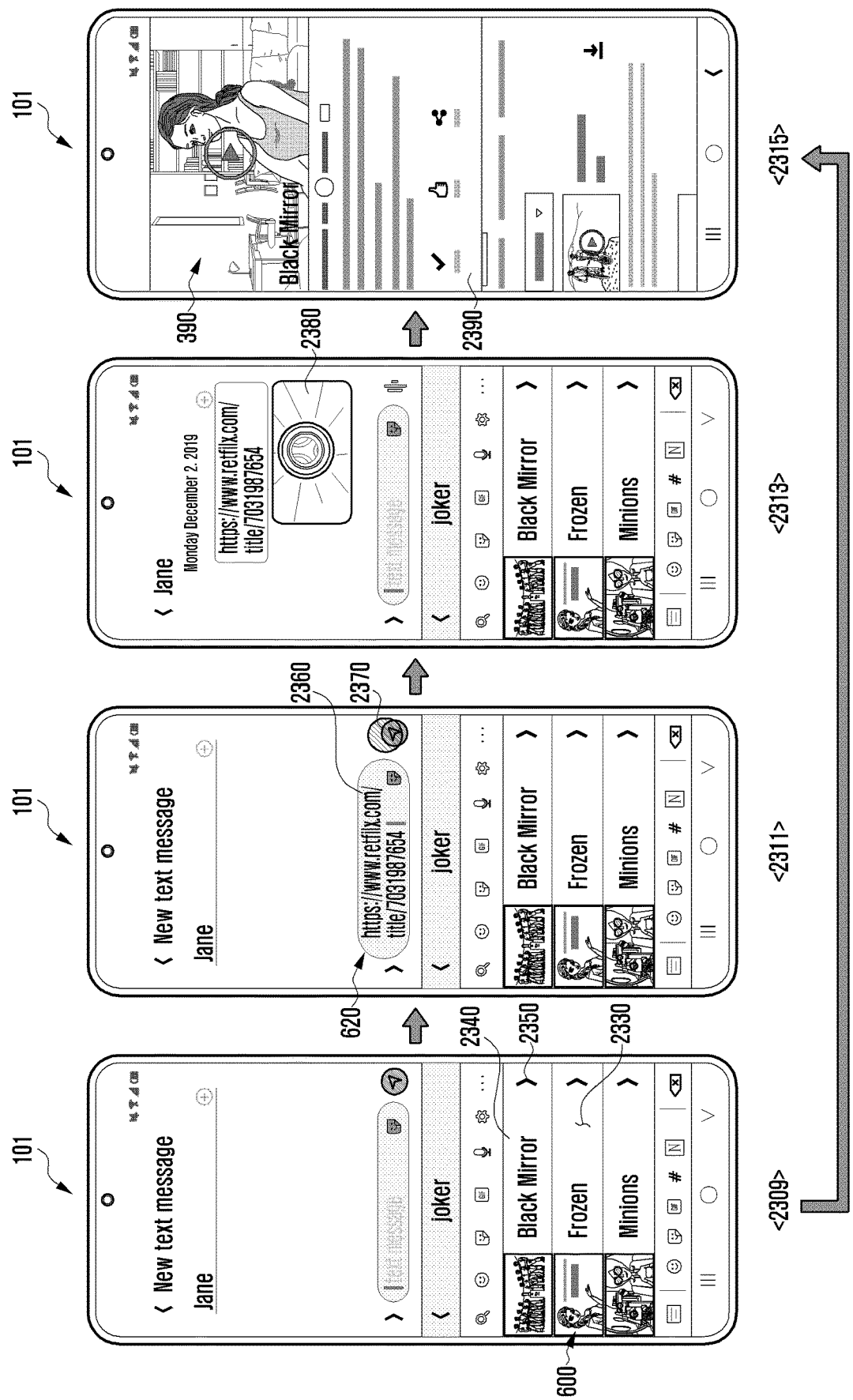

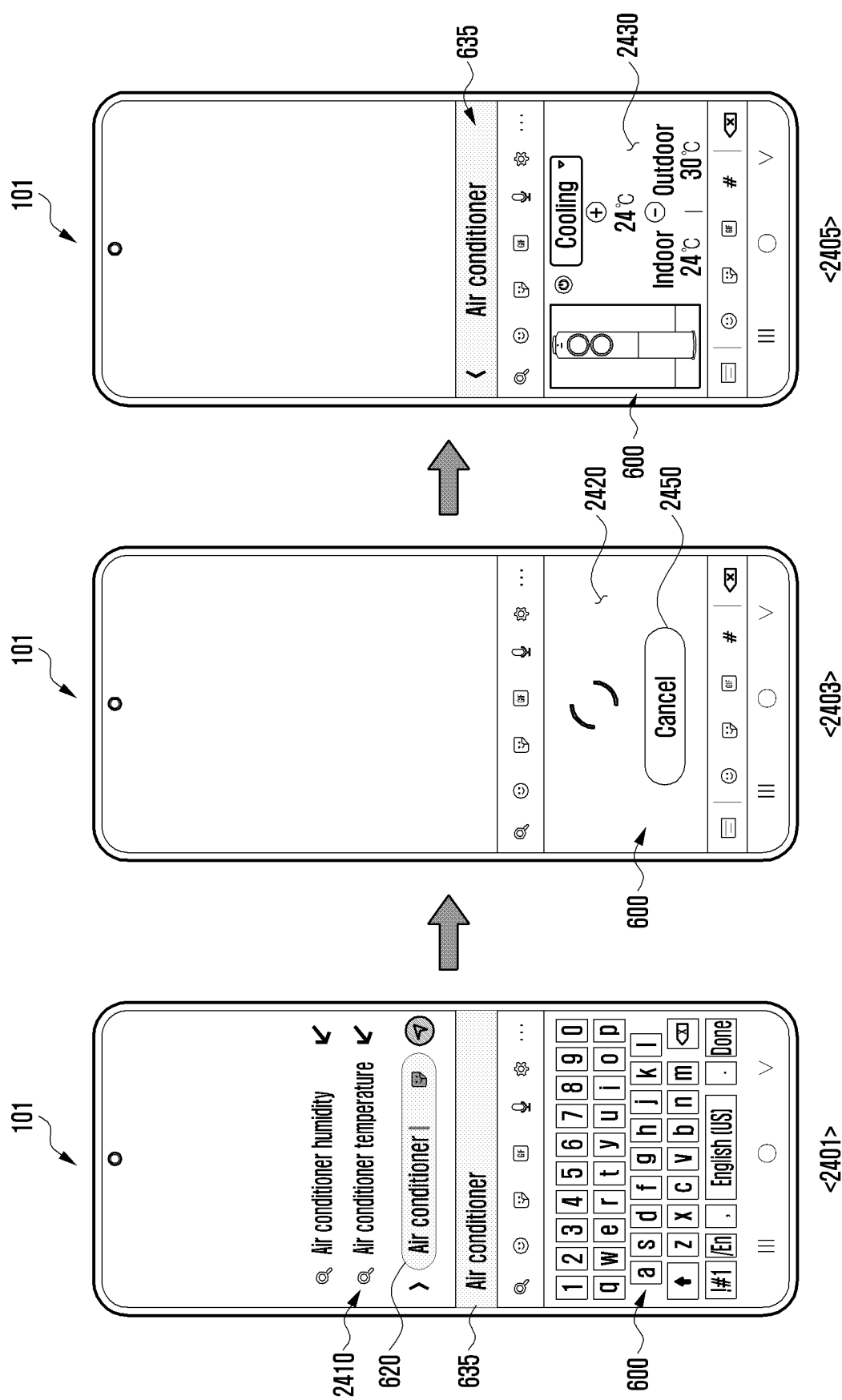

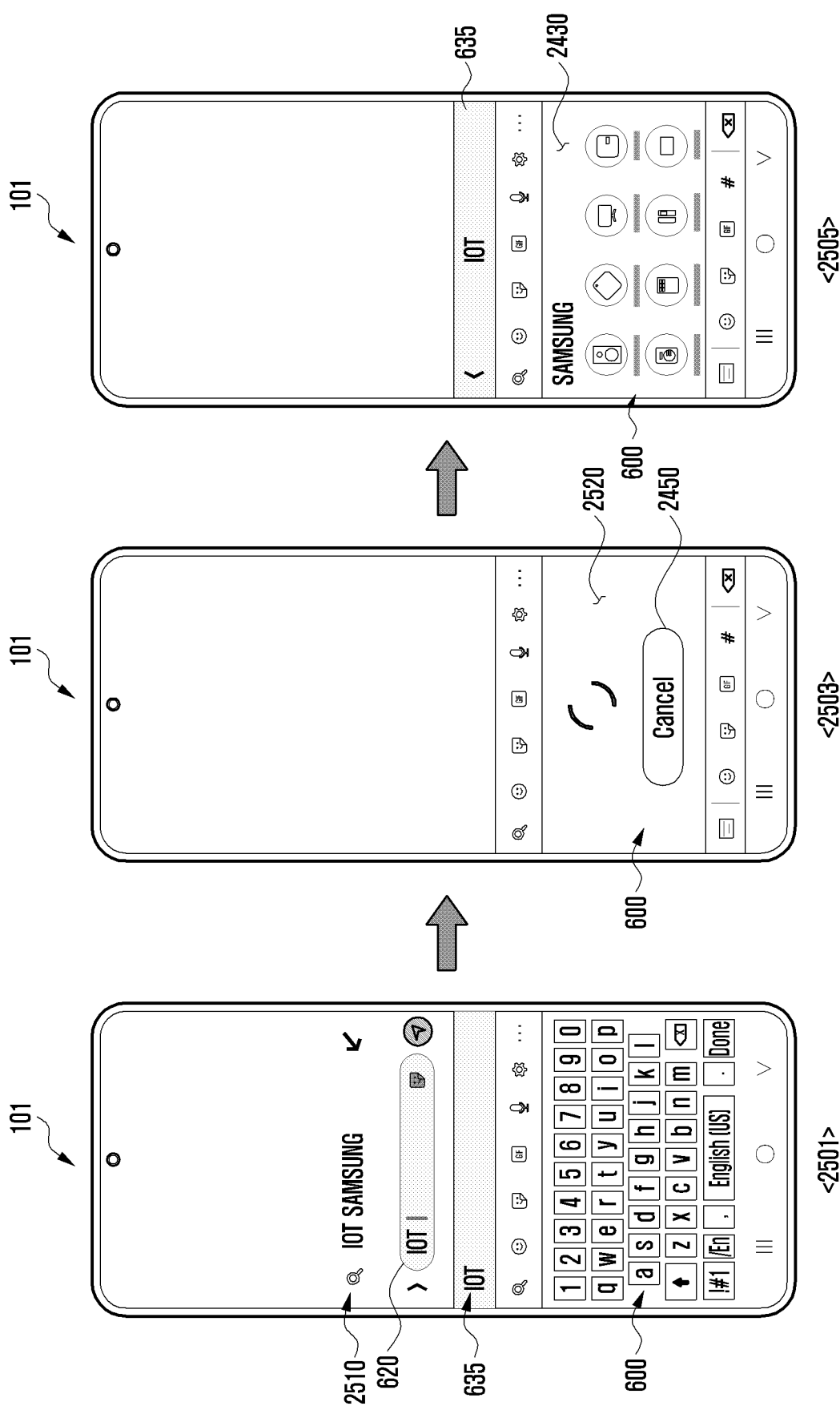

APPARATUS AND METHOD FOR PROVIDING CONTENT SEARCH USING KEYPAD IN ELECTRONIC DEVICE

CROSS REFERENCE TO RELATED APPLICATIONS

This application is a continuation of International Application No. PCT/KR2021/009575, filed on Jul. 23, 2021, which claims priority to Korean Patent Application No. 10-2020-0091574 filed on Jul. 23, 2020 in the Korean Intellectual Property Office, the disclosures of which are herein incorporated by reference.

TECHNICAL FIELD

Various embodiments of the disclosure relate to method and apparatus for providing content search using a keypad (or keyboard) in an electronic device.

BACKGROUND ART

With the recent developments in digital technology, various types of electronic devices such as mobile communication terminals, smart phones, tablet personal computers (PCs), notebooks, or wearable devices have been made widely available. In order to support and increase functions of such electronic devices, hardware part and/or software of these electronic devices are continuously researched and developed.

Not only have the functions of such electronic devices increased, but storage capacity has also increased. Accordingly, the electronic devices may install a number of applications, and a user may generate various types of content according to the application usage and store the generated content in the memory of the electronic device. For example, the content stored in the electronic devices may include a plurality of pieces of content for each application.

Recently, the electronic device provides various search functions. For example, an electronic device may provide a search function for content stored in the electronic device and a search function for content stored on a remote external server connected to the electronic device through a network. According to an embodiment, one or more pieces of content stored in the electronic device may be associated with a corresponding application and information on the content (e.g., metadata) may be stored.

In order for the user to search for designated content in the electronic device, a desired application may be executed, and a search may be performed by entering information (e.g., a keyword) related to the designated content using a keypad (or keyboard) within the executed application. In order for the user to search for the designated content (or other content) in another application, the user may cause the electronic device to execute the other application and may perform a search using the other application. In other words, when searching for content in an electronic device, the user may perform a search within one application (or service or module), and in order to perform a search in another application, the user generally would need to perform a content search after causing the electronic device to execute the other application.

As described above, conventionally, an application to be searched may be executed, and a search may be performed only through a search application programming interface (API) provided by the application. However, as the number of applications and the amount of content stored in the electronic device have increased, when searching for content using a keypad in the electronic device, it may take a long time to search for content and may cause user inconvenience due to repetitive execution of various applications and repetitive keyword input and search execution via the keypad for each application where a search is conducted. For example, when the user wants to search for the same search keyword (or search query) in various different applications, he or she conventionally would have to repetitively input the same search keyword into multiple applications, which is inconvenient and may cause the user to spend a long period of time to search for and check content for each application. Accordingly, there is a need for a function that enables the electronic device to search for content more quickly and conveniently.

DISCLOSURE OF INVENTION

Technical Problem

Various embodiments provide a method and apparatus capable of providing an integrated search of various applications using a keypad of an electronic device that is quicker and more convenient than conventional search methods.

Various embodiments provide a method and apparatus capable of searching for content inside and/or outside of an electronic device via an input of one search keyword (or search query) using a keypad and providing a search result through the keypad.

Various embodiments provide a method and apparatus capable of supporting an integrated search (or smart search) on a keypad of an electronic device, searching for all applications (or service or module) of the electronic device supporting the integrated search, and providing (or displaying) the searched result through the keypad.

Various embodiments provide a method and apparatus capable of implementing an integrated search even for an application newly installed in the electronic device.

Various embodiments provide a method and apparatus capable of performing content search for various applications based on an input keyword (or search query) when content (dynamic content) is searched on a keypad of an electronic device and providing the searched content as attribute-based content through the keypad.

Solution to Problem

An electronic device according to an embodiment of the disclosure may include: a display; a wireless communication circuit; a memory; and a processor configured to be operatively connected to the display, the wireless communication circuit, and the memory, wherein the processor may be configured to: display an execution screen of an application; detect a first input for a keypad call; display the keypad on the execution screen, may detect a second input for a smart search while displaying the keypad; request a content search from at least one application of the electronic device; and display a search result searched by the at least one application through the keypad.

An electronic device according to an embodiment of the disclosure may include: an input module; a display module; a processor configured to be operatively connected to the input module and the display module; and a memory configured to be operatively connected to the processor, wherein the memory may store instructions, when executed, that cause the processor to: display the input module on the display module; predict a plurality of applications for an integrated search of the electronic device based on a keyword input through the input module; perform an integrated search of content according to the keyword based on the predicted application; and provide the search result through the input module.

A method of operating an electronic device according to an embodiment of the disclosure may include: displaying an execution screen of an application; detecting a first input for a keypad call; displaying the keypad on the execution screen; detecting a second input for a smart search while displaying the keypad; requesting a content search from at least one application of the electronic device; and display a search result searched by the at least one application through the keypad.

In order to solve the above problems, various embodiments of the disclosure may include a computer-readable recording medium storing a program for executing the above-described method in a processor.

Further scope of applicability of the disclosure will become apparent from the detailed description below. However, various changes and modifications within the spirit and scope of the disclosure may be clearly understood by those skilled in the art, and thus specific embodiments such as the detailed description and preferred embodiments of the disclosure should be understood as being given by way of example only.

SUMMARY

According to an electronic device and a method of operating the same according to various embodiments disclosed herein, the user may integrate and search for content inside/outside the electronic device based on various applications of the electronic device through a single search operation using a keypad of the electronic device. According to various embodiments, the user may perform an integrated search of various types of contents related to various applications through a single input of a keyword (or a search query) using a keypad. According to various embodiments, after performing an integrated search of various types of content, the user may conveniently check the search results (e.g., content), which are classified into different categories, through the keypad.

According to various embodiments, when a new application is installed, the electronic device may be automatically configured to support the smart search (or integrated search) for the new application using a plug-in format (or technique) without modifying (or additional configuring) the keypad used for the search function in the new application.

In addition, various effects that are directly or indirectly identified through this document can be provided.

BRIEF DESCRIPTION OF DRAWINGS

In connection with the description of the drawings, the same or similar reference numerals may be used for the same or similar components.

FIG. 20 is a diagram illustrating an example of providing a search result using a keypad in an electronic device according to various embodiments of the disclosure.

FIGS. 23A and 23B are diagrams illustrating an example of performing a search using a keypad of an electronic device and providing a result thereof according to various embodiments of the disclosure.

FIG. 24 is a diagram illustrating another example of performing a search using a keypad of an electronic device and providing a result thereof according to various embodiments.

FIG. 25 is a diagram illustrating another example of performing a search using a keypad of an electronic device and a result thereof according to various embodiments of the disclosure.

DESCRIPTION

Figure 1:
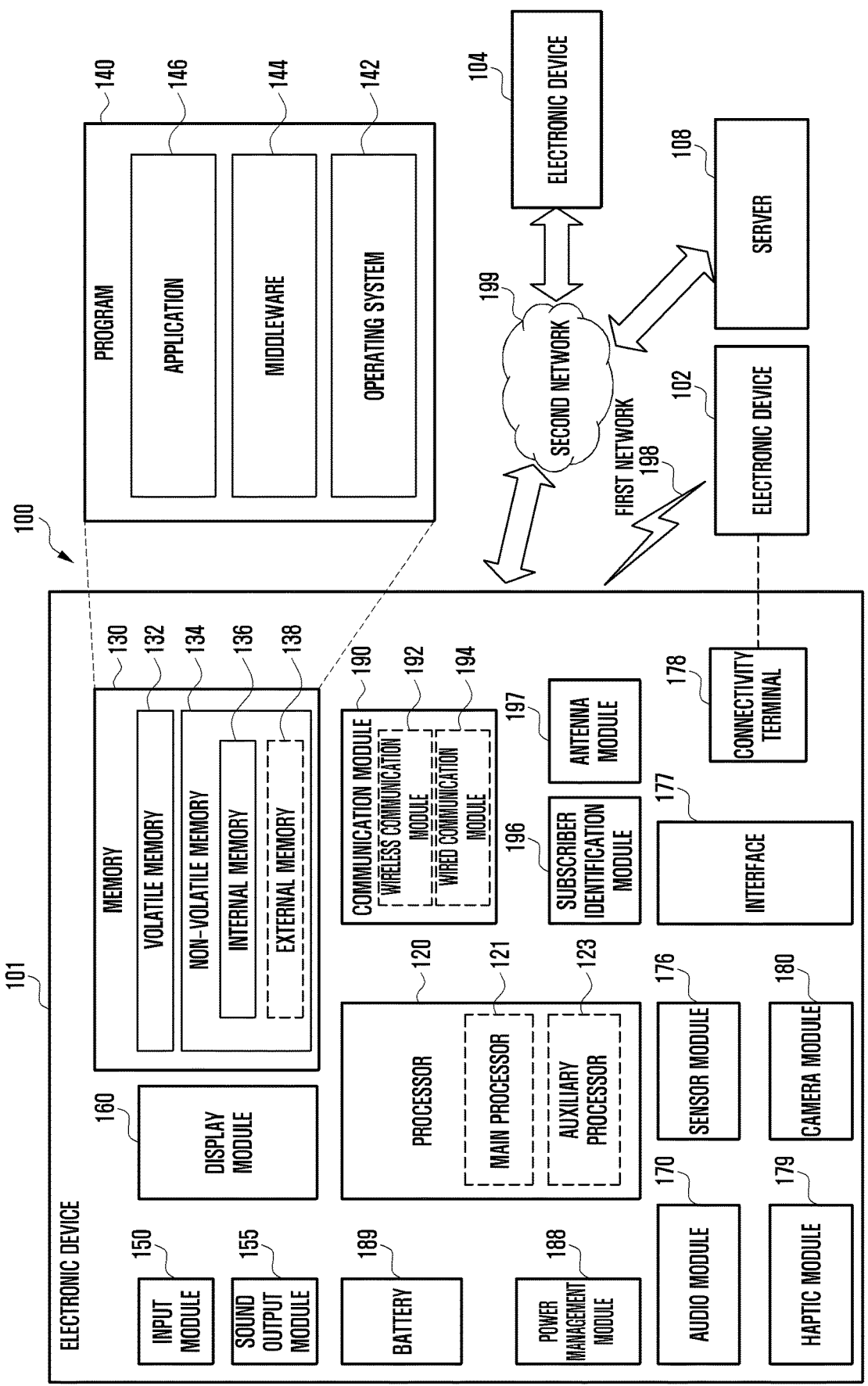
FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
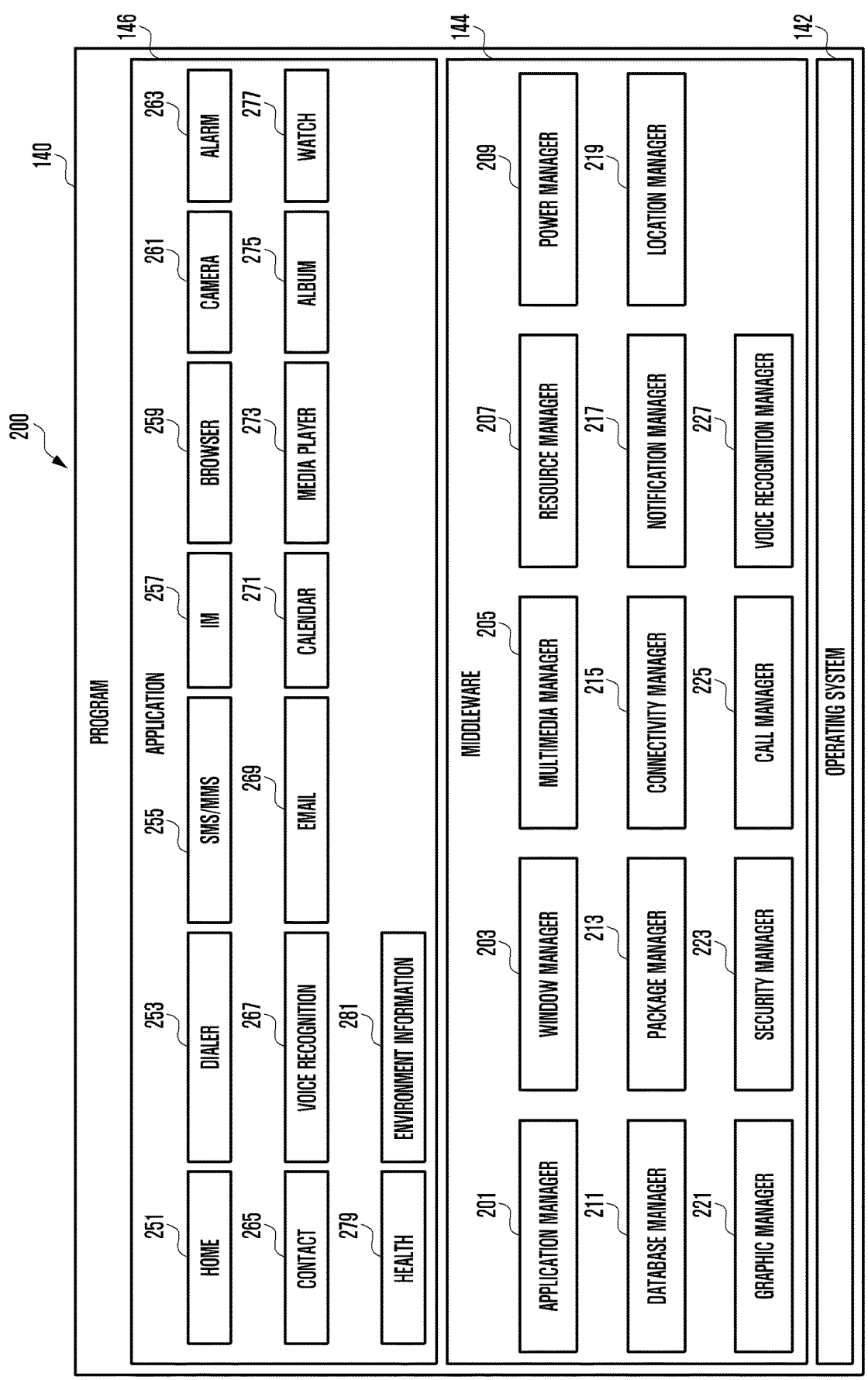
FIG. 2 is a block diagram illustrating the program according to various embodiments.

FIG. 2 is a block diagram 200 illustrating the program 140 according to various embodiments.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device.

The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
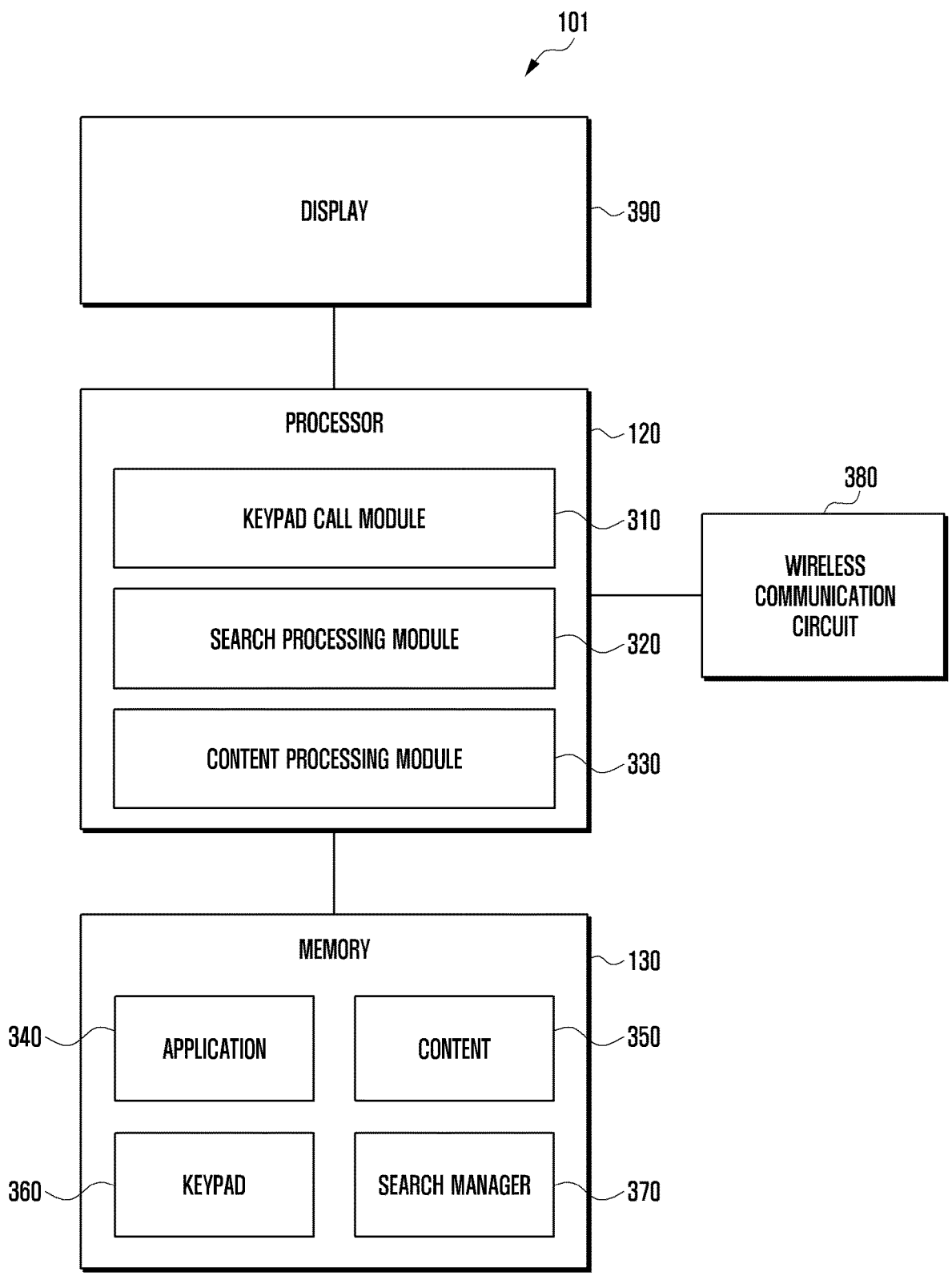
FIG. 3 is a schematic diagram illustrating a configuration of an electronic device according to various embodiments.

FIG. 3 is a schematic diagram illustrating a configuration of an electronic device according to an embodiment.

FIG. 3 illustrates an example of a configuration related to providing an integrated search (or smart search) based on a keypad in an electronic device (e.g., the electronic device 101 of FIG. 1) according to various embodiments. According to an embodiment, the electronic device 101 may include various types of devices that provide (e.g., display) a keypad 360 (or a keyboard) through the display 390. For example, the electronic device 101 may be a mobile communication terminal, a smart phone, a tablet personal computer (PC), a notebook, and/or a digital camera.

Referring to FIG. 3, the electronic device 101 according to an embodiment may include the display 390 (e.g., the display module 160 of FIG. 1), the memory 130, a wireless communication circuit 380 (e.g., the wireless communication module 192 of FIG. 1), and the processor 120.

According to an embodiment, the display 390 may visually provide information to the outside of the electronic device 101 (e.g., a user). According to an embodiment, the display 390 may include a touch circuit (or touch sensor) (not shown) or a pressure sensor, and may measure changes in a signal (e.g., voltage, amount of light, resistance, and/or amount of charge) in order to detect the specific position of an object (e.g. finger) on the display 390 based on the touch circuit or the pressure sensor, thereby detecting a touch input and/or a hovering input (or proximity input).

According to an embodiment, the display 390 may be composed of a liquid crystal display (LCD), an organic light emitted diode (OLED), an active-matrix organic light emitted diode (AMOLED), or a flexible display.

According to an embodiment, the display 390 may visually provide various types of information related to a user's use of an image (e.g., photographing, editing, and/or sharing) under the control of the processor 120. For example, the display 390 may provide (e.g., display) an execution screen of the application 340, an execution screen of content 350 stored in the memory 130, and/or the keypad 360.

According to an embodiment, the memory 130 may store various types of data used by at least one component of the electronic device 101 (e.g., the processor 120). The data may include, for example, the application 340 (e.g., the application 146 of FIG. 1), the content 350, the keypad 360, and/or the search manager 370. According to an embodiment, the application 340, the keypad 360, and/or the search manager 370 may be stored as software (e.g., the program 140 of FIG. 1 or 2) on the memory 130, and may be executable by the processor 120.

According to an embodiment, the application 340 may include various types of applications such as an Internet browser, a video (or video playback) application, a music (or music playback) application, a communication connection application, a contact application, a document application, a messenger application, a gallery application, a message application, a memo (or note) application, a file management application, a voice recording application, and/or a recording application, but is not limited thereto. According to an embodiment, the application 340 may receive a content search request based on a designated search keyword (or search query) from the search manager 370 and may perform a content search based on the search keyword. According to an embodiment, in response to the content search request, the application 340 may perform a corresponding search (e.g., internal search or external search) based on attributes (e.g., content search attribute in the electronic device 101 or external (e.g., web) content search attribute) of the application 340 in the background, and may provide the search result to the keypad 360 and/or the search manager 370.

According to an embodiment, the keypad 360 may generate various input signals required for the operation of the electronic device 101. According to an embodiment, the keypad 360 may be displayed through the display 390, and may provide touch input and/or hovering input (or proximity input) at various designated positions of the keypad 360 based on the touch circuit of the display 390. According to an embodiment, the keypad 360 may be implemented differently depending on various input modules (or input means). For example, the keypad 360 may be provided in the form of an input module including at least one of various key maps such as a 3*4 key map, a 5*4 key map, a QWERTY key map, and/or a Dvorak key map. According to an embodiment, at least a part (e.g., at least one specific key button and/or a key map structure itself) of the key map of the keypad 360 may be changed and displayed according to the user's use of the keypad 360 and/or a designated input.

According to an embodiment, the keypad 360 may be operatively coupled to the application 340 and the search manager 370. For example, the keypad 360 may receive an input event (or a detected input signal) from the user and may generate a search keyword (or a search query) based on the input event and provide it to the search manager 370. According to an embodiment, the keypad 360 may receive a search result (e.g., content) searched according to the search keyword (or search query) and/or information related to the search result from the application 340, and may provide (e.g., display) the content in a scrollable list format. For example, the keypad 360 may remove at least a part of the key map of the keypad 360, and may replace and provide (e.g., display) at least a part of an area where the key map is provided with the content.

According to some embodiments, the keypad 360 may have the size of a shape for supporting use of one hand (e.g., left-hand mode or right-hand mode) in a designated direction and a key map structure, the size of a shape for supporting use of both hands and a key map structure, and/or the size of a shape for supporting general use and a key map structure.

According to an embodiment, the search manager 370 may receive an input event from the keypad 360 and may provide dynamic content requests based on the received event to various applications 340. According to an embodiment, the search manager 370 may receive an input signal related to a search keyword (or search query) through the keypad 360 and may request a content search based on the search keyword from various applications 340. According to an embodiment, the search manager 370 may collect (or gather) search results from each of the applications 340 and may provide the collected search results to the keypad 360.

According to an embodiment, the processor 120 may process operations related to providing an integrated search of content for various applications 340 in the electronic device 101. According to an embodiment, while displaying an execution screen (e.g., including a home screen) of a designated application 340 through the display 390, the processor 120 may display the keypad 360 on the execution screen based on a user input for calling up the keypad 360. According to an embodiment, while displaying the keypad 360 through the display 390, the processor 120 may request a content search from the application 340 based on a user input for a smart search.

According to an embodiment, the processor 120 may request a content search from at least one application 340 capable of searching for content (or information) in the application 340 stored in the electronic device 101. According to an embodiment, the processor 120 may perform a search of each application 340 of the electronic device 101 based on the search keyword (or search query), and may acquire a search result from the at least one application among the plurality of applications 340.

According to an embodiment, the processor 120 may control the keypad 360 and the display 390 to display content (e.g., dynamic content) searched by the application 340 through at least a portion of the keypad 360. According to an embodiment, the processor 120 may control the keypad 360 and/or the display 390 to classify the search results from various applications 340 into separate categories and to display object and content corresponding to each category through the keypad 360.

According to an embodiment, the processor 120 may include a keypad call module 310 (or call means), a search processing module 320 (or a search processing means), and/or a content processing module 330 (or a content processing means). According to an embodiment, the functions of the keypad call module 310, the search processing module 320, and/or the content processing module 330 that can be executed by the processor 120 may be implemented and stored in the form of instructions (command) in the memory 130.

According to an embodiment, the keypad call module 310 may call the keypad 360 designated (or configured) in the electronic device 101 and may display the called keypad 360 through the display 390. According to an embodiment, the keypad call module 310 may call the keypad 360 based on a user input (or event) (e.g., a voice command input and/or a touch command input) for calling up the keypad while the execution screen of an application is displayed through the display 390, and may display the keypad 360 in at least a partial area on the execution screen displayed through the display 390.

According to an embodiment, the search processing module 320 may search for dynamic content in various applications 340 based on a search keyword (or search query) input through the keypad 360. According to an embodiment, when the user inputs a designated keyword (e.g., "joker") through the keypad 360 and selects (or touches or clicks) a search button to request a search for content (e.g., dynamic content) for the keyword, the search processing module 320 may request every application 340 to perform a content search related to the keyword. According to an embodiment, dynamic content may refer to various types of content related to keywords provided by each application 340. According to an embodiment, the search processing module 320 may perform the content search related to the keyword using every application 340 of the electronic device 101. According to an embodiment, the keyword may be input based on at least a part of text, voice, electronic pen, touch, and/or gesture.

According to an embodiment, the search processing module 320 may acquire (or collect) the search result (e.g., dynamic content) of the content for the keyword from each application 340. According to an embodiment, the search processing module 320 may directly retrieve the search result for the keyword through a provider and/or an application programming interface (API) call for every application 340, and/or may retrieve the search result for the keyword through a search engine provided by a finder module.

In an embodiment, the content processing module 330 may perform the operation of classifying the content (e.g., dynamic content) in the search result and displaying the classified content through the keypad 360. According to an embodiment, the content processing module 330 may classify at least one piece of content in the search result based on an attribute of the content and may group the content with the same attribute. For example, the content processing module 330 may analyze an attribute of each piece of content acquired from at least one application 340 and may form a group of the content from different applications for each attribute according to the attribute of each piece of content.

According to an embodiment, the dynamic content may include various types of contents which can be generated by various applications (services), such as web, emoji, sticker, graphics interchange format (GIF), tag, contact, gallery, payment Apps, music (e.g., melon), over the top (OTT) (e.g., Netflix), video on demand (VOD) (e.g., YouTube), digital multimedia broadcasting (DMB), and/or Internet of things (IoT), and the attributes of the content may be classified according to various services.

According to some embodiments, the content processing module 330 may classify the pieces of content in the search result according to the application corresponding to each piece of content, and may group the content. For example, the content processing module 330 may analyze the attribute of each piece of content acquired from the at least one application 340 and/or the attribute (e.g., attribute according to a function of an application such as music playback, video playback, gallery, and/or contact) of the application, and may group the content according to the attribute of each piece of content and/or the attribute of the application. According to an embodiment, the attributes of the content and the attributes of the application may have the same or similar meaning. For example, the content processing module 330 may classify the attributes of the content (or application) as shown in Table 1 below, and may store and manage the classified attributes in the memory 130.

TABLE 1

| Classification | Category (or group) | |
|---|---|---|
| 1 | web | |
| 2 | image | emoji |
| | | sticker |
| | | GIF |
| | | bitmoji |
| 3 | payment (e.g., Samsung pass) | |
| 4 | music | music 1 (e.g., Spotify) |
| | | music 2 (e.g., Melon) |
| 5 | note | |
| 6 | video | OTT (e.g., Netflix) |
| | | VOD (e.g., YouTube) |
| | | DMB |
| 7 | IoT | |
| 8 | tag | |
| 9 | my files | |
| 10 | contact | |
| 11 | gallery | |
| 12 | car | |
| 13 | settings | |

As illustrated in Table 1, according to an embodiment, the electronic device 101 may provide an integrated search of various types of contents of various applications (e.g., including a 3rd party application) installed on the electronic device 101. According to an embodiment, in the case of 3rd party applications, when installed in the electronic device 101, it may be automatically configured to provide an integrated search using the keypad 360 by interlocking with the keypad 360 in a plug-in manner.

According to an embodiment, the content processing module 330 may provide content through the keypad 360. For example, the content processing module 330 may provide (e.g., display) corresponding content based on a tap (e.g., or category tap or tap menu) for each category (or group) according to the classification of the content related to the keyword and each tap. The content may be displayed within at least a portion of the keypad 360. According to an embodiment, the content processing module 330 may provide the content in the form of a scrollable list through each tabs provided through the keypad 360. According to an embodiment, when a user input for the content provided through the keypad 360 is received, the content processing module 330 may perform a task (e.g., sharing or execution) related to the corresponding content based on the user input.

According to an embodiment, the wireless communication circuit 380 may support establishing a communication channel between the electronic device 101 and an external electronic device (e.g., the electronic device 102 or 104 of FIG. 1) and performing communication through the established communication channel. For example, the wireless communication circuit 380 may communicate with the external electronic device 102 or 104 through a first network 198 (e.g., a short-range communication network such as Bluetooth, Wi-Fi direct or IrDA) or a second network 199 (e.g., a telecommunication network such as a legacy cellular network, a 5G network, a next-generation communication network, Internet, or a computer network {e.g., LAN or WAN}).

Figure 4:
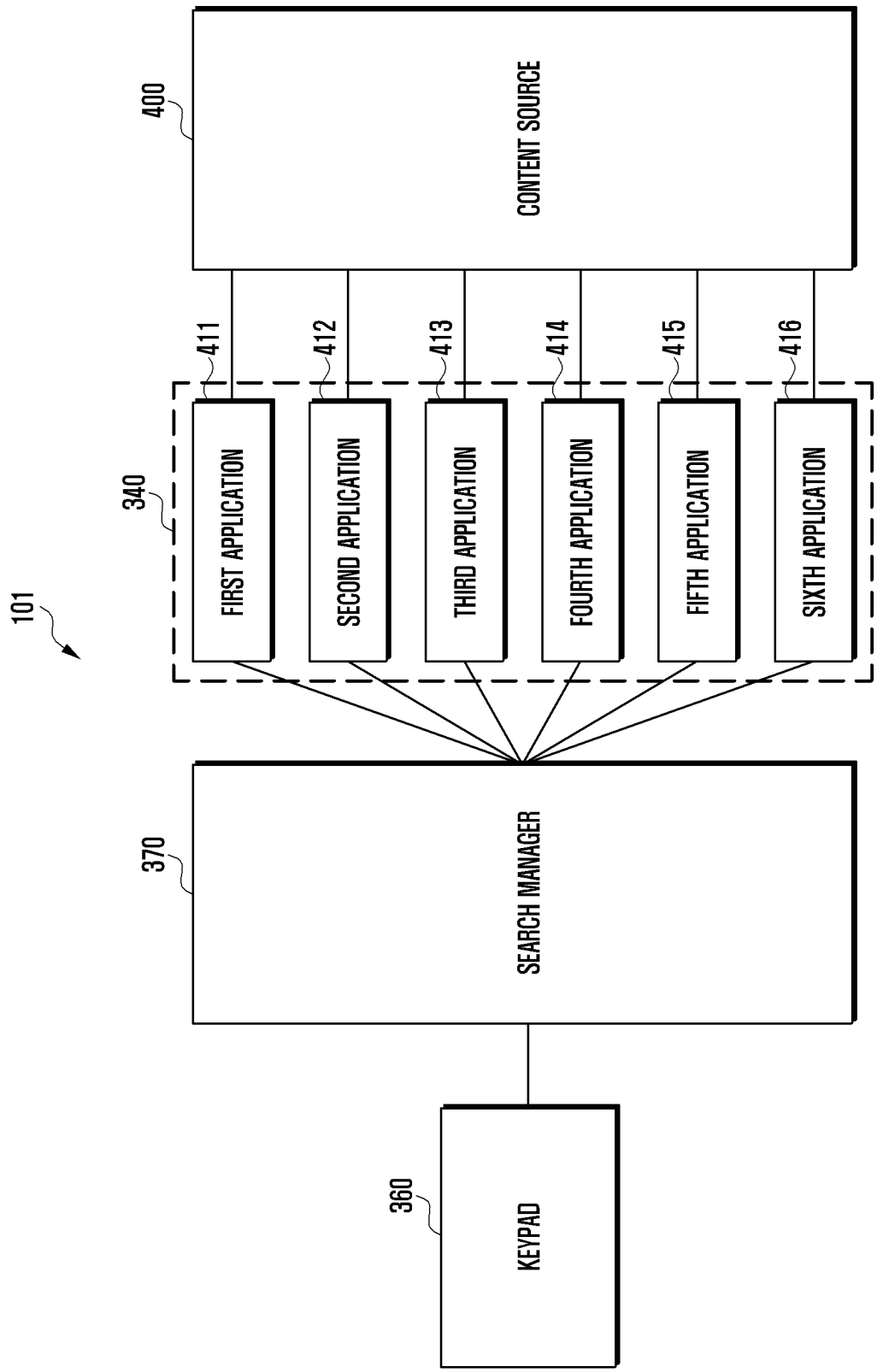
FIG. 4 is a diagram illustrating an example of providing a content search in an electronic device according to various embodiments of the disclosure.

FIG. 4 is a diagram illustrating an example of providing a content search in an electronic device according to various embodiments of the disclosure.

Referring to FIG. 4, an electronic device (e.g., the electronic device 101 of FIG. 1) may display a keypad (e.g., the keypad 360 of FIG. 3) in at least a portion of a display (e.g., the display 390 of FIG. 3) based on a user input. According to an embodiment, the keypad 360 may receive an event from a user. For example, the keypad 360 may receive a keyword input and a content search request (e.g., a button and/or a voice-based search command) event based on the keyword from the user. According to an embodiment, the event may include an input using the keypad 360 (e.g., text input or touch of a search button), an input using voice, an input using an electronic pen, and/or an air gesture input using an electronic pen. According to an embodiment, the keypad 360 may provide an event (e.g., keyword input and search request) to a search manager (e.g., the search manager 370 of FIG. 3) in response to the reception of the event. For example, the keypad 360 may transmit the event to the search manager 370 to request event-based dynamic content.

According to an embodiment, the search manager 370 (or the search processing module 320 and/or the content processing module 330) may receive an event from the keypad 360, and may send a dynamic content request based on the received event to every application 340 (e.g., a first application 411, a second application 412, a third application 413, a fourth application 414, a fifth application 415, and a sixth application 416). According to an embodiment, the search manager 370 may receive an input signal related to a search keyword (or search query) from the keypad 360 and may request a content search based on the search keyword from each application 340. According to an embodiment, the application 340 (e.g., the first application 411, the second application 412, the third application 413, the fourth application 414, the fifth application 415, or the sixth application 416) may receive a content search request based on a designated search keyword (or search query) from the search manager 370 and may perform a content search based on the search keyword.

According to an embodiment, in response to the content search request of the application 340, the application 340 may perform a corresponding search (e.g., internal search or external search) of a content source 400, based on attributes (e.g., content search attribute in the electronic device 101 or external (e.g., web) content search attribute) of the application 340 in the background. For example, the content source 400 may include the memory 130 of the electronic device 101 that stores content (e.g., the content 350 of FIG. 3) related to each application 340, an external server that is connected by the application 340 and provides the requested content (e.g., the server 108 of FIG. 1) (e.g., a cloud server, a social network server {or SNS, social network services/sites}, a web server {or a web site} {e.g., a sound source site or a video sharing site}, a game server, and/or a content server). According to an embodiment, the application 340 may perform the content search related to the keyword using the content source 400, may obtain (or collect) the search result to provide the obtained result to the search manager 370 (and/or the keypad 360).

According to an embodiment, the search manager 370 may collect (or gather) search results from each application 340 and may provide the collected search results to the keypad 360. According to an embodiment, the search manager 370 may control the keypad 360 and the display 390 to display content (e.g., dynamic content) searched by the application 340 through at least a portion of the keypad 360. According to an embodiment, the search manager 370 may classify the search results from the applications 340 into various categories, and may control the keypad 360 and the display 390 to display an object (e.g., category tap or tap menu) and content corresponding to the categories through the keypad 360. According to an embodiment, the keypad 360 may display an object (e.g., tap menu) for each category (or group) according to the classification of the content related to the keyword and the corresponding content based on each object through at least a portion of the keypad 360. According to an embodiment, the keypad 360 may provide the content in the form of a scrollable list.

The electronic device 101 according to an embodiment of the disclosure may include the display 390 (e.g., the display module 160 of FIG. 1), the wireless communication circuit 380 (e.g., the wireless communication module 192 of FIG. 1), the memory 130, and the processor 120 that is operatively connected to the display 390, the wireless communication circuit 380 and the memory 130. The processor 120 may display an execution screen of an application, may detect a first input for calling a keypad 600 (e.g., the keypad 360 of FIG. 3), may display the keypad 600 on the execution screen, may detect a second input for a smart search while displaying the keypad 600, may request a content search from at least one application of the electronic device 101, and may display a search result searched by the at least one application through the keypad 600.

According to an embodiment of the disclosure, the processor 120 may call the keypad 600 based on the detection of the first input while the execution screen is displayed, and may control the display 390 to display the keypad 600 in at least a portion of the execution screen.

According to an embodiment of the disclosure, the processor 120 may receive a keyword and a search command as the second input while the keypad 600 is displayed through the display 390, and may control a plurality of applications to perform the content search based on the keyword.

According to an embodiment of the disclosure, the processor 120 may obtain the search result from the at least one application among the plurality of applications, and may provide the obtained search result to the keypad 600.

According to an embodiment of the disclosure, the processor 120 may remove at least a part of a key map of the keypad 600 and convert an area corresponding to the part of the key map into a view area for a content display.

According to an embodiment of the disclosure, the processor 120 may classify the search result by the at least one application into different categories, and may provide the one or more objects corresponding to the categories and content for each of the one or more objects through the keypad 600.

According to an embodiment of the disclosure, the processor 120 may provide the search result in a form of a scrollable list through for each of the one or more objects.

According to an embodiment of the disclosure, the processor 120 may receive a third input from the search result corresponding to a designated object activated through the keypad 600, and may process a task related to the execution of the content based on the third input.

According to an embodiment of the disclosure, the processor 120 may process a first task for transmitting and sharing the content to another electronic device based on the third input that is first designated, and may process a second task for executing the content in the electronic device 101 based on the third input that is second designated.

According to an embodiment, the processor 120 may provide an integrated search of the content for each application, using a learning model trained using an artificial intelligence algorithm.

According to an embodiment, the processor 120 may provide the integrated search of the content for each application, using the learning model trained using at least one of machine learning, neural network, genetic, deep learning, or classification algorithm, as the artificial intelligence algorithm.

The electronic device 101 according to certain embodiments of the disclosure may include the input module 150 (e.g., the keypad 360 or 600 of FIG. 3 or 6), the display module 160 (e.g., the display 390 of FIG. 3), the processor 120 configured to be operatively connected to the input module 150 and the display module 160, and the memory 130 configured to be operatively connected to the processor 120. The memory 130 may store instructions, when executed, that cause the processor 120 to display the input module 150 on the display module 150, to predict a plurality of applications for an integrated search of the electronic device 101 based on a keyword input through the input module 150, to perform an integrated search of content according to the keyword based on the predicted applications, and to provide the searched search result through the input module 150.

Hereinafter, methods of operating the electronic device 101 of various embodiments will be described in detail. According to an embodiment, operations performed by the electronic device 101 described below may be executed by the processor 120 including at least one processing circuit of the electronic device 101. According to an embodiment, the operations performed by the electronic device 101 may be instructions stored in the memory 130 and the instructions may be executed by the processor 120.

According to certain embodiments, the electronic device 101 may include at least one processor 120 that is operatively connected to the display 390 (e.g., the display module 160 of FIG. 1), the memory 130, the display 390, and the memory 130. According to certain embodiments, the processor 120 may perform an operation related to providing an integrated search of content for each application, using a learning model trained using an artificial intelligent (AI) algorithm. According to an embodiment, using at least one of machine learning, neural network, genetic, deep learning, or classification algorithm as the AI algorithm, the processor 120 may predict a plurality of applications for an integrated search of the electronic device 101 based on a search keyword (or search query) input through an input module (or input means) (e.g., the keypad 360 or a microphone), may perform the integrated search of content according to the search keyword of the predicted applications, and may provide the search results through the keypad 360.

Figure 5:
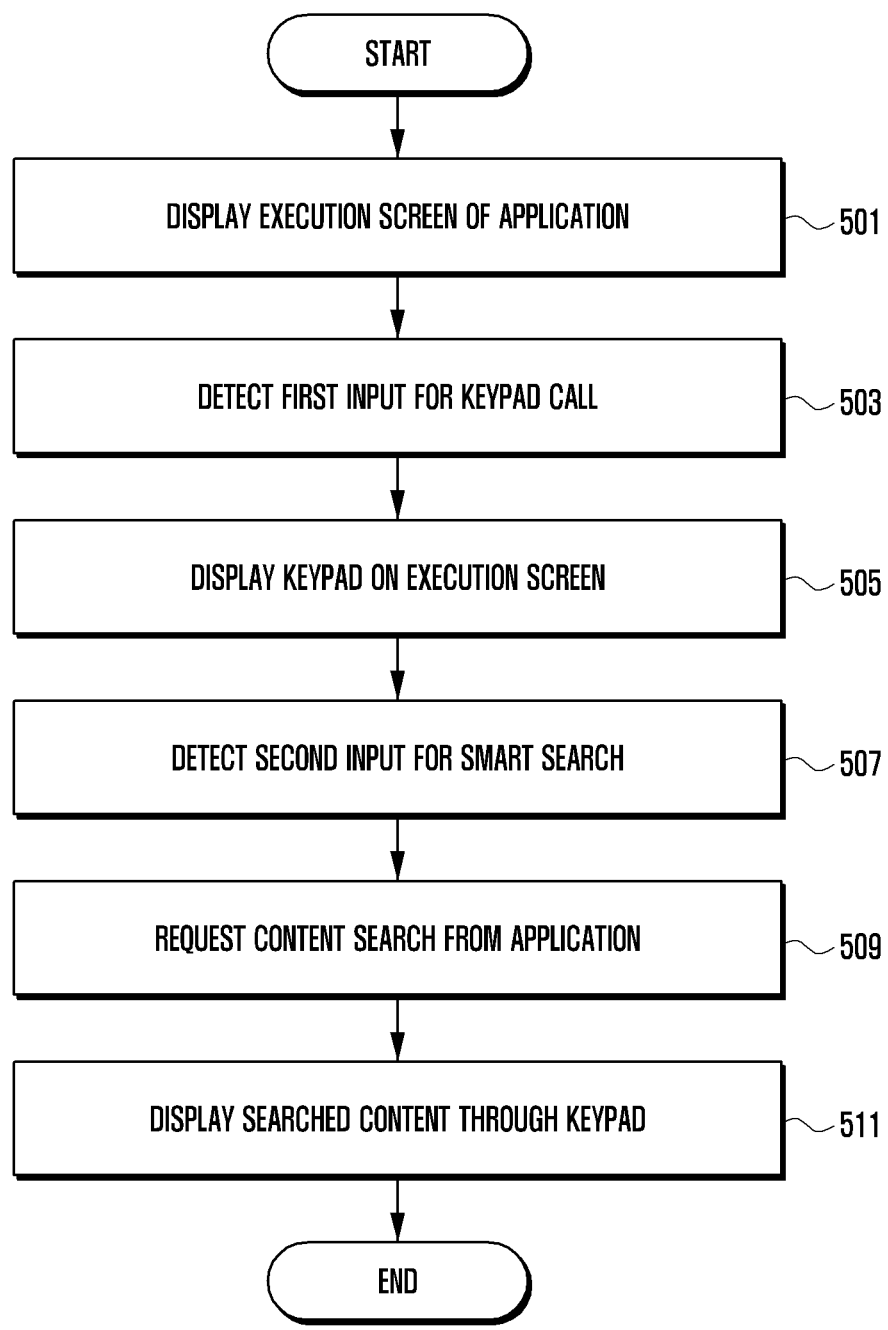
FIG. 5 is a flowchart illustrating the operation of an electronic device according to various embodiments.

FIG. 5 is a flowchart illustrating the operation of an electronic device according to an embodiment.

Operations 501 to 511 of FIG. 5 may be implemented as instructions (commands) that may be executed by the processor 120 of the electronic device 101 of FIGS. 1 to 4.

Referring to FIG. 5, in operation 501, the processor 120 of the electronic device 101 may display an application execution screen (e.g., including a home screen) through the display 390.

In operation 503, the processor 120 may detect a first input for calling the keypad 360 (e.g., a first user input based on a voice command and/or a touch command) while displaying the application execution screen.

In operation 505, the processor 120 may display the keypad 360 on the execution screen of the application. For example, while the execution screen of the application is displayed on the display 390, the processor 120 may call up the keypad 360 based on detecting the first input, and may control the display 390 to display the keypad 360 in at least a portion of the execution screen.

In operation 507, the processor 120 may detect a second input for a smart search (e.g., a dynamic content integrated search). According to an embodiment, the processor 120 may receive a keyword related to the smart search and a search command (e.g., a second user input based on a voice command and/or a touch command) as the second input while displaying the keypad 360 through the display 390. According to an embodiment, the keyword may be input based on text, voice electronic pen, a touch, and/or gesture. According to an embodiment, the search command may include a touch command input using an object (e.g., a smart search button) provided for the search command through the keypad 360, and/or a designated voice command (e.g., "Find") input. For example, the keypad 360 may include at least one object for receiving the keyword for the smart search and the search command as the second input.

In operation 509, the processor 120 may request a content search from one or more application based on the second input. According to an embodiment, the processor 120 may request a content search from at least one application capable of searching for content (or information) among the applications 340 stored in the electronic device 101. According to an embodiment, the processor 120 may cause the plurality of applications of the electronic device 101 to perform a search related to the plurality of applications, based on a search keyword (or search query), and may obtain a search result from at least one application among the plurality of applications.

In operation 511, the processor 120 may display the searched content through the keypad 360. According to an embodiment, the processor 120 may control the keypad 360 and the display 390 to display content (e.g., dynamic content) searched by the application through at least a portion of the keypad 360. According to an embodiment, the processor 120 may classify the search results by the at least one application into various categories, and may display an object and content corresponding to the categories through the keypad 360.

Figure 6:
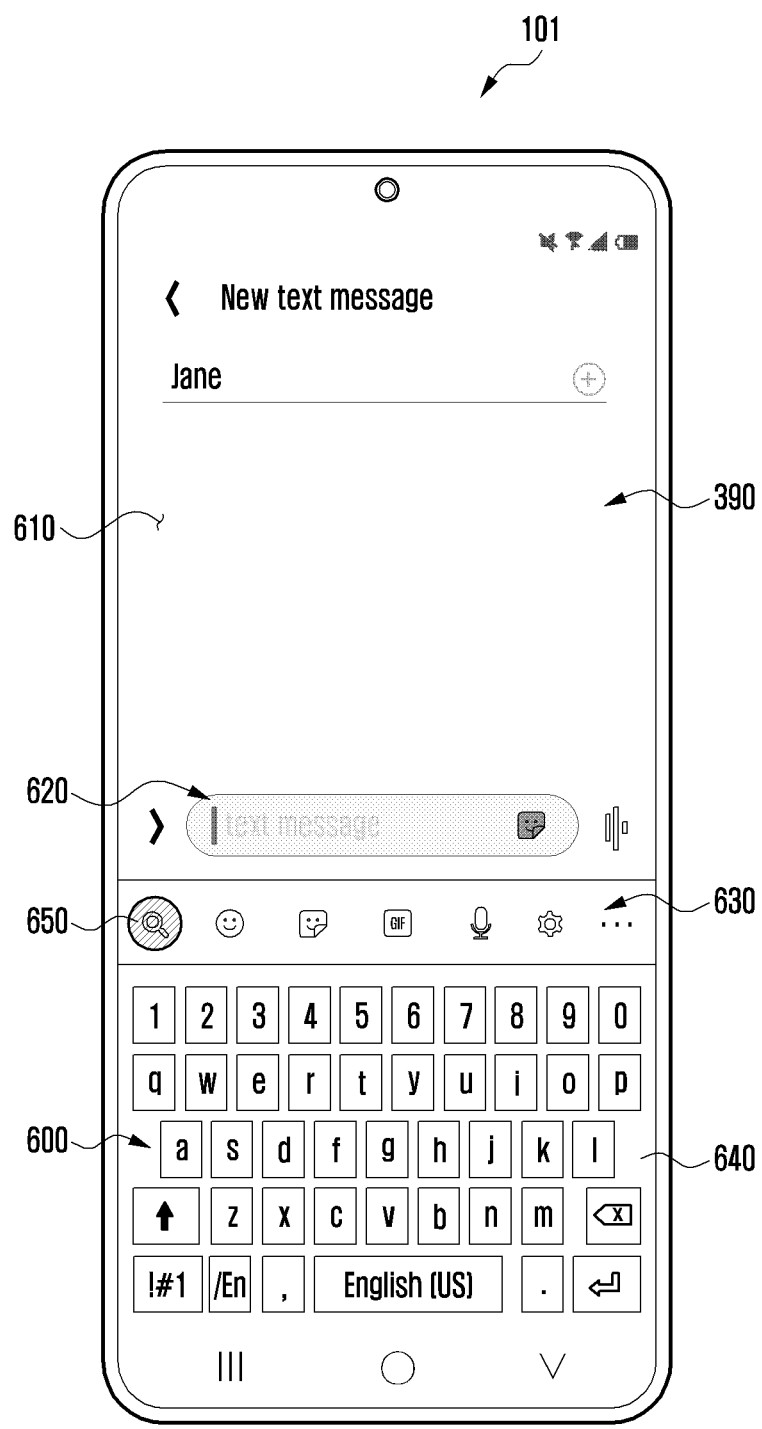
FIGS. 6, 7, and 8 are diagrams illustrating an example of a search using a keypad in an electronic device according to various embodiments of the disclosure.
Figure 7:
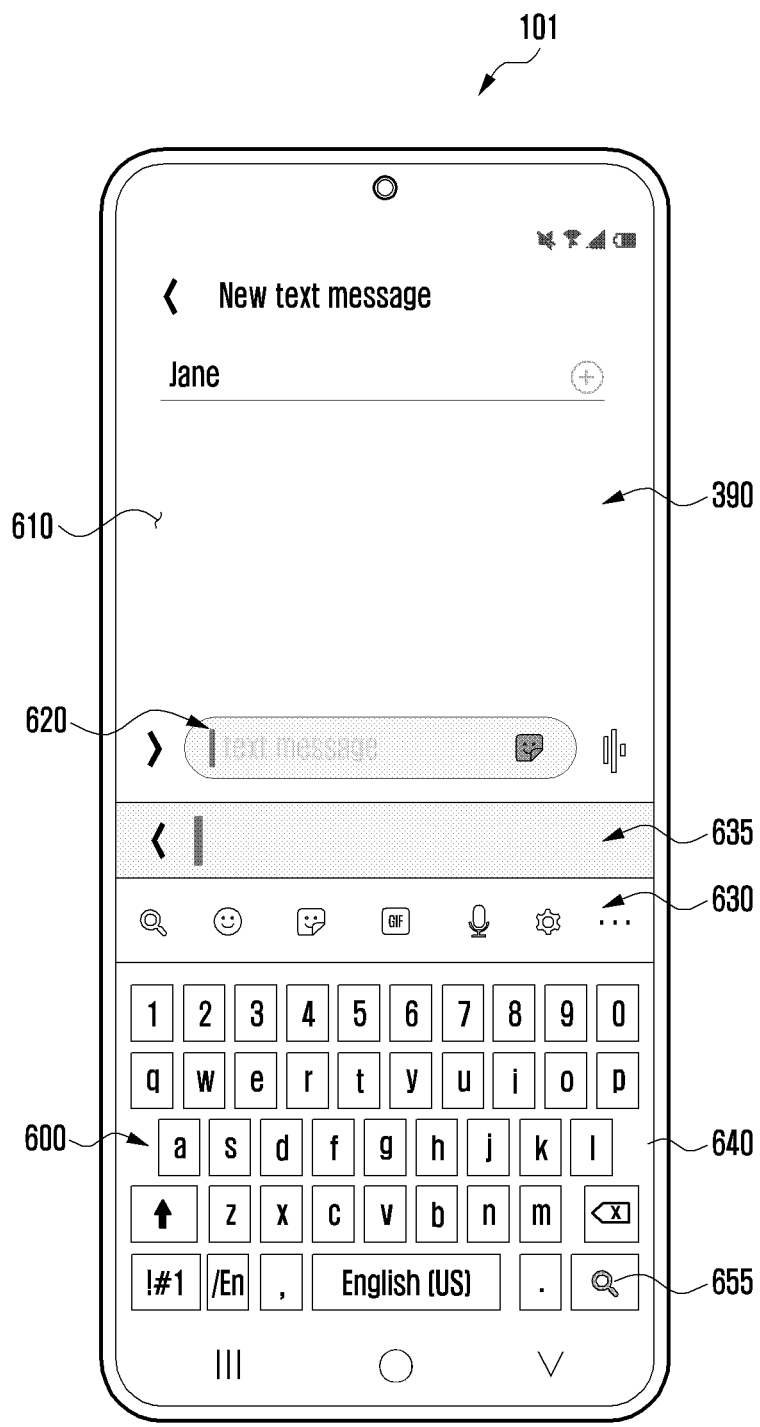
Figure 8:
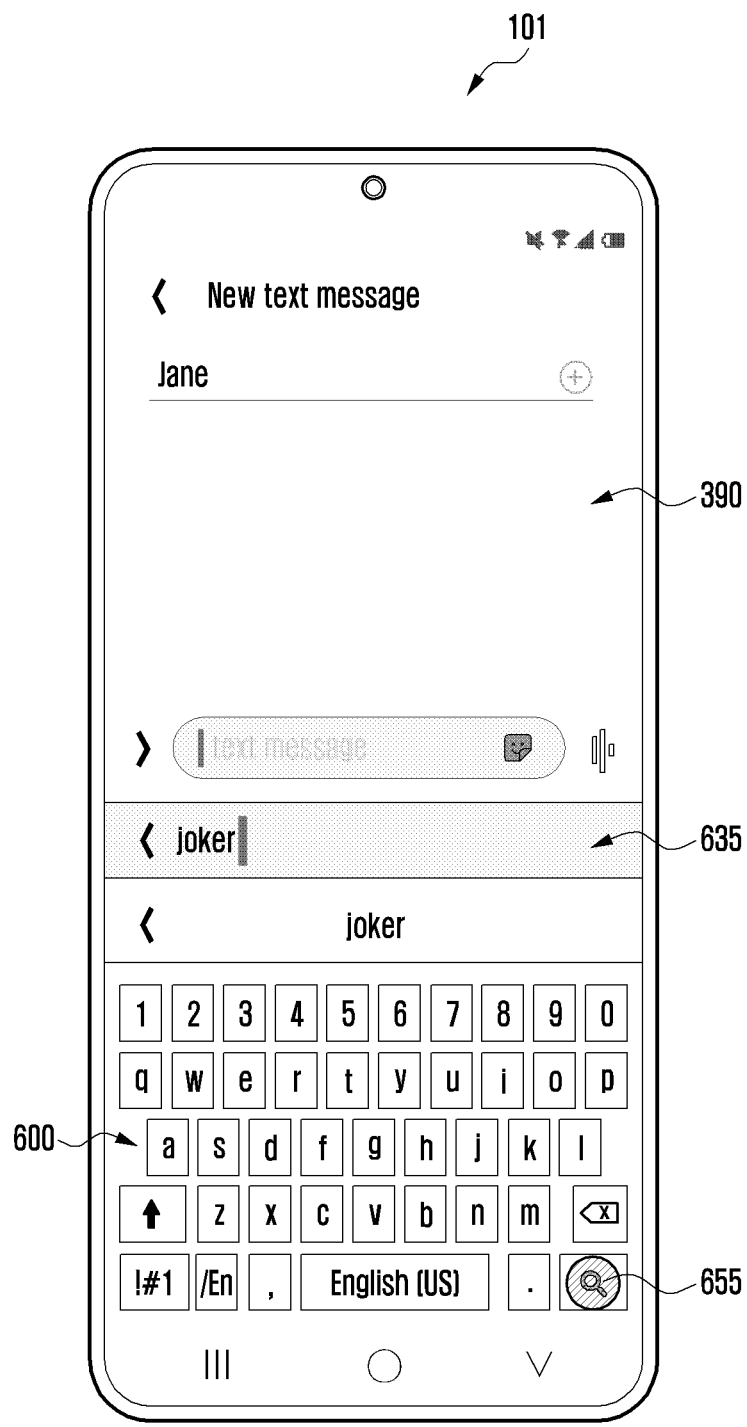

FIGS. 6, 7, and 8 are diagrams illustrating an example of a search using a keypad in an electronic device according to various embodiments of the disclosure.

According to an embodiment, FIGS. 6, 7, and 8 illustrate an example operation of displaying the keypad 600 (e.g., the keypad 360 of FIG. 3 or 4) in at least a portion of the display 390 of the electronic device 101 and performing a search based on a search keyword input through the keypad 600.

Referring to FIGS. 6, 7, and 8, the electronic device 101 may display an execution screen 610 of an application through the display 390. According to an embodiment, the execution screen 610 of the application may include a message writing screen of a short message service (SMS) and/or multimedia messaging service (MIMS) application.

As illustrated in FIG. 6, the electronic device 101 may display the keypad 600 by overlapping at least a part of the keypad 600 on the execution screen 610 displayed through the display 390, or may display the keypad 600 as an independent area (or window) distinguished from the execution screen 610.

According to an embodiment, the keypad 600 may include an interface such as an input area 620 (or an input window) for a keyword input (e.g., text), a toolbar area 630, and/or a key map area 640. According to an embodiment, the keypad 600 may include a search object 650 in at least a partial area for performing a search function. According to an embodiment, in the example shown in FIG. 6, the search object 650 may be provided through the toolbar area 630. According to some other embodiments, the search object 650 may be provided as a key (or button) (e.g., a button 655 in FIG. 7) designated in the key map area 640.

According to an embodiment, a user may select the search object 650 to access (or enter) a smart search (or integrated search) mode. For example, when a user input (e.g., touch) is detected through the search object 650, the electronic device 101 may execute the smart search mode.

Referring to FIG. 7, the user may input a keyword (e.g., text) (e.g., "joker") related to a content search using at least one key button of the key map area 640. According to an embodiment, the electronic device 101 may display on the keyword area 635 (or the input area 620) text (e.g., characters) corresponding to an input signal (e.g., a key button signal) input through the key map area 640 (e.g., "joker" in the keyword area 635 of FIG. 8). For example, when a keyword related to a content search using at least one key button is input while executing the smart search mode, the electronic device 101 may activate the keyword area 635 and may display text corresponding to the keyword input of the user on the keyword area 635. According to some other embodiments, the electronic device 101 may omit the keyword area 635 and may display text corresponding to the keyword input using the input area 620.

According to some embodiments, before the user inputs the keyword (e.g., before typing the key button), the electronic device 101 may provide at least one keyword which has been previously searched, in for example an upper end area adjacent to the keypad 600. According to some embodiments, the electronic device 101 may provide a prediction keyword in the upper end area adjacent to the keypad 600 in response to the keyword input of the user (e.g., sequential typing of the key button). For example, when a user inputs a key button mapped with the character "m" in the key map area 640, the electronic device 101 may provide at least one prediction keyword (e.g., music, movie, mobile, motor, mine, emoji, or bitmoji, ...) starting from the character "m" and/or including the character "m" in the upper end area while displaying the character "m" in the input area 620. According to an embodiment, the prediction keyword may be predicted based on the search keyword history of the user. According to some embodiments, the prediction keyword may include an associated keyword related to the letter input by the user (e.g., unfinished keywords).

According to an embodiment, while the keyword is being input, the electronic device 101 may dim the toolbar area 630 and may display the dimmed toolbar area 630. According to an embodiment, when switching to the smart search mode based on the input of the search object 650 in the example of FIG. 6, the electronic device 101 may convert a character (or icon or image) mapped (virtually imprinted) to the command execution button 655 (e.g., enter button) of the key map area 640 into a search object (or smart search execution object) of a designated type and may provide the search object, as shown in the example of FIG. 7. For example, the command execution button 655 may be provided after being converted into a designated search button so that the user can easily (or intuitively) identify that the smart search mode is currently running.

Referring to FIG. 8, when the user completes an input of the keyword (e.g., "joker"), the user may select the command execution button 655 (e.g., smart search execution object) so that the electronic device 101 can perform a search related to the keyword. According to an embodiment, when a user input (e.g., touch) is detected through the command execution button 655, the electronic device 101 may perform an operation of searching for content related to the keyword using each application.

Figure 9:
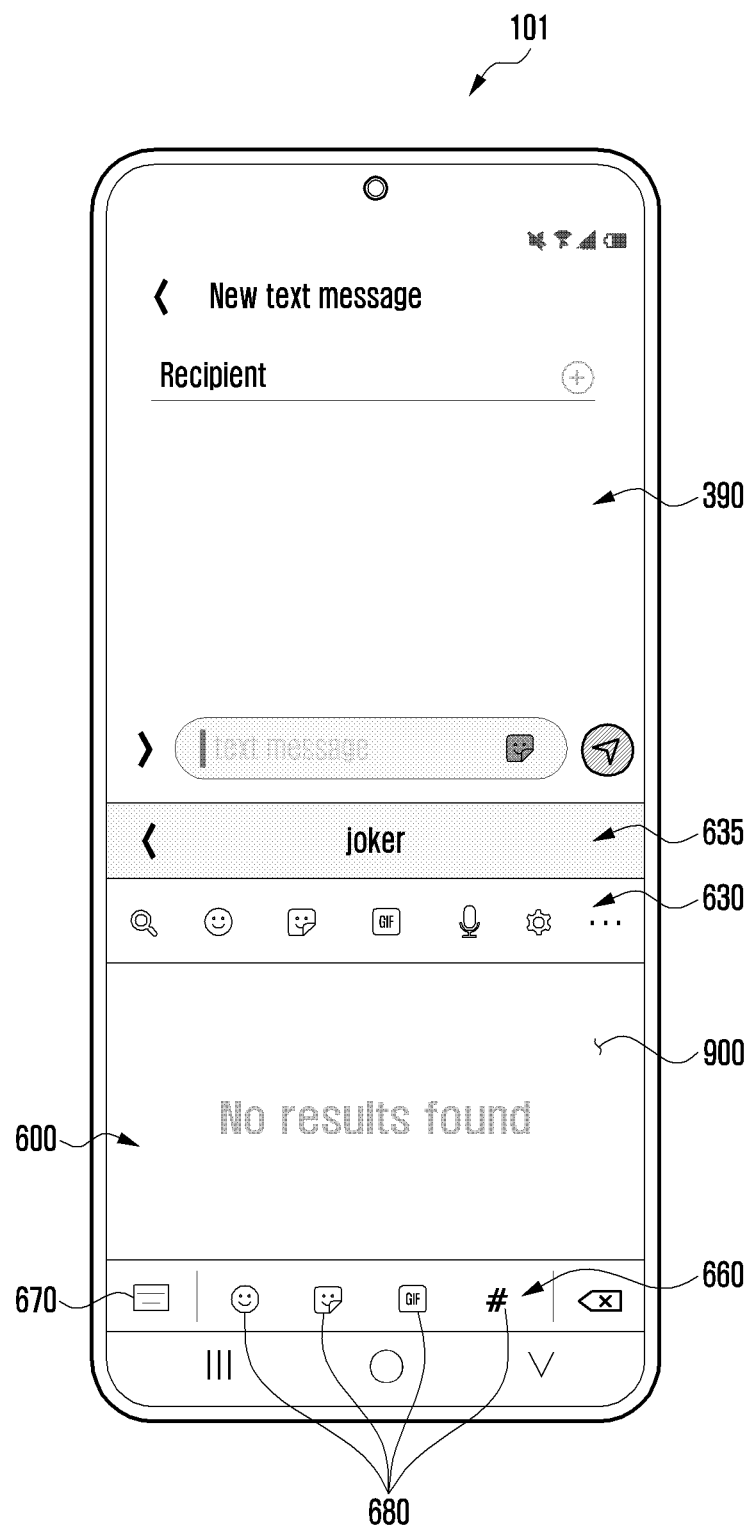
FIGS. 9, 10, and 11 are diagrams illustrating an example of providing a search result through a keypad in an electronic device according to various embodiments of the disclosure.
Figure 10:
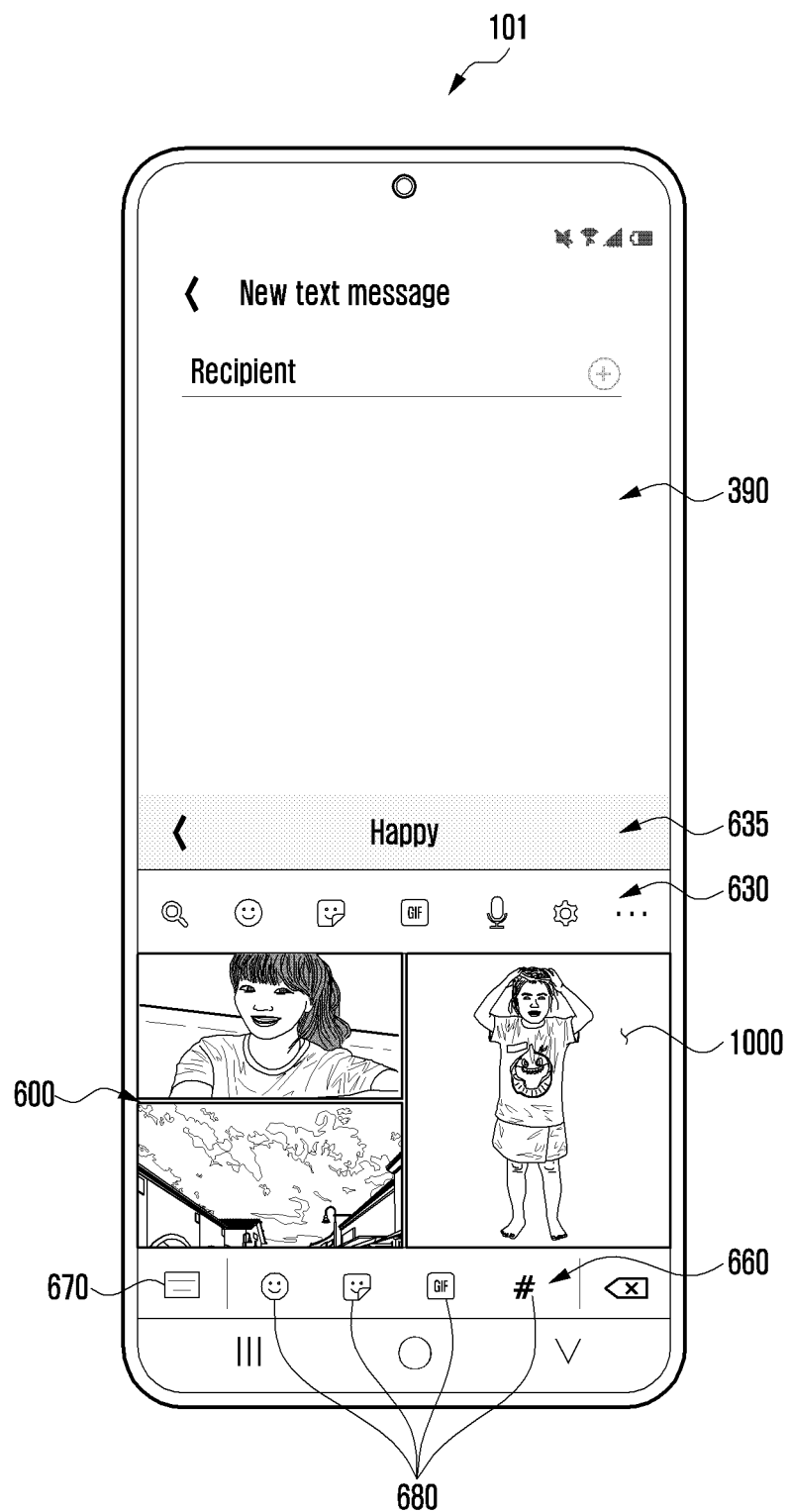
Figure 11:
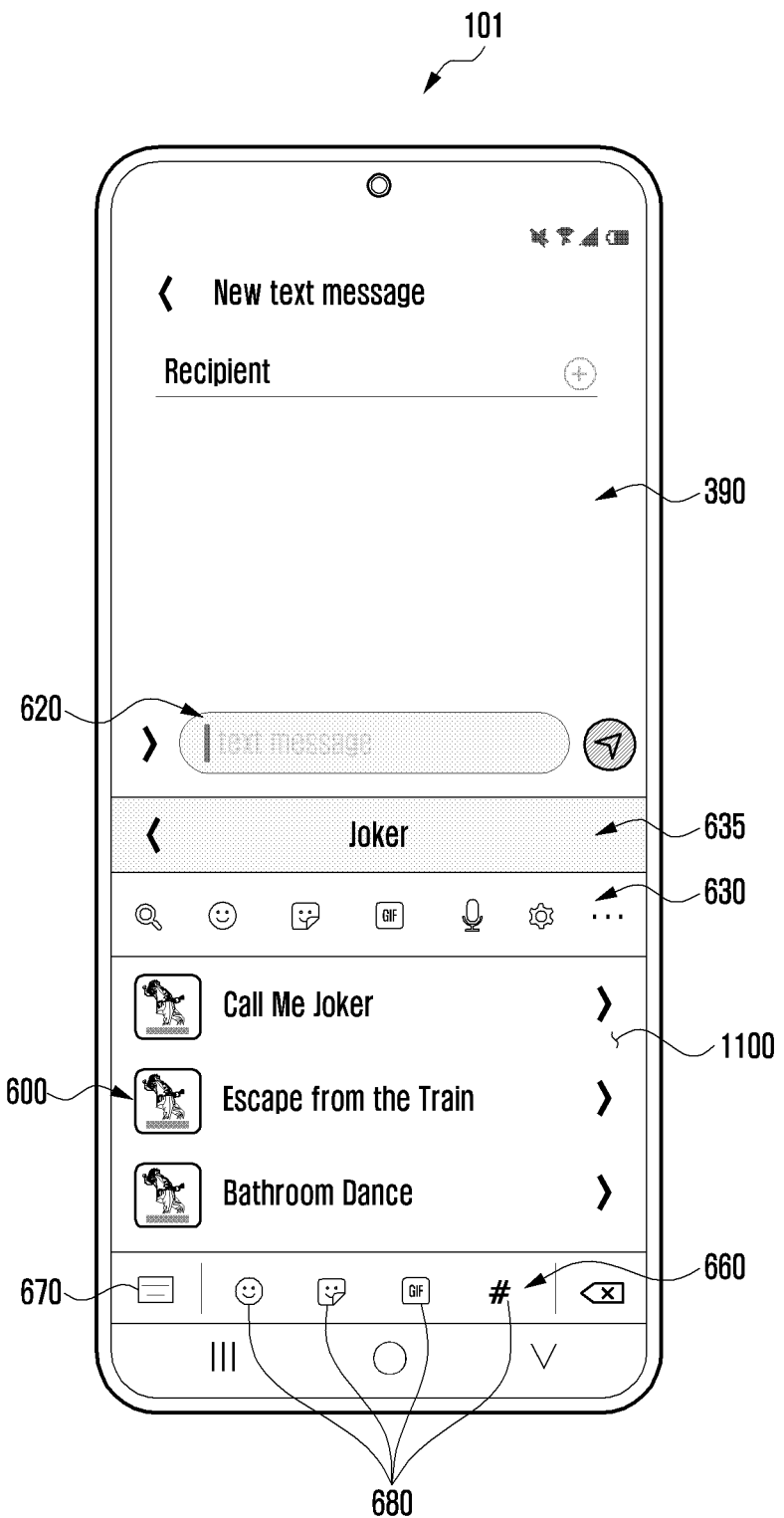

FIGS. 9, 10, and 11 are diagrams illustrating an example of providing a search result through a keypad in an electronic device according to various embodiments of the disclosure.

According to an embodiment, FIGS. 9, 10, and 11 illustrate an example of an operation of providing a research result of content by the electronic device 101 through the keypad 600 when search execution based on an input keyword is requested, as shown with reference to FIGS. 6, 7 and 8.

As illustrated in FIGS. 9, 10, and 11, the electronic device 101 may provide a search result of content through at least a portion of the keypad 600 (e.g., at least a portion of the key map area 640). According to an embodiment, the electronic device 101 may remove at least a portion of the key map of the key map area 640, and may replace and provide (e.g., display) the area where at least the key map area was with the content. According to an embodiment, the electronic device 101 may provide an object 680 (e.g., a representative icon indicating a category and/or a representative icon indicating an application) corresponding to the categories as shown in the example of Table 1, in another partial area 660 of the keypad 600 (e.g., a category area replacing another portion of the key map area 640).

According to some embodiments, the electronic device 101 may include and provide a conversion object 670 in a designated area (e.g., at least a partial area of the category area 660) for converting back into the keypad 600 (e.g., displaying a key map) for additional key input from the user. According to some embodiments, the electronic device 101 may provide the keyword area 635 in an upper end adjacent to the toolbar area 630. For example, the electronic device 101 may provide the keyword (e.g. the keyword or text related to content to be searched) input by the user in the keyword area 635 so that the user can check the search that is currently run.

Referring to FIG. 9, FIG. 9 illustrates an example in which content or search result of a particular category corresponding to the keyword is not searched (or does not exist). For example, when content of a designated keyword in a designated category (or designated application) is not searched or found, when the corresponding object is activated (e.g., through the object 680 corresponding to the category, when a user input {e.g., touch} is detected), an example of providing the result information 900 (or a result screen) (e.g., "No results found" or a blank screen) is shown.

Referring to FIGS. 10 and 11, FIGS. 10 and 11 illustrate an example of a case in which content of various categories are found and displayed. For example, when content corresponding to a designated keyword is searched in a designated category (or designated application), when various corresponding objects are activated, examples of providing the result information 1000 or 1100 (e.g., an object {e.g., image, video, text, icon, and/or link} related to the content) are shown. According to an embodiment, the electronic device 101 may provide the content 1000 or 1100 in the form of a scrollable list through an objects (e.g., objects that can be tapped by the user) for each category (or application) provided through the keypad 600.

Figure 12:
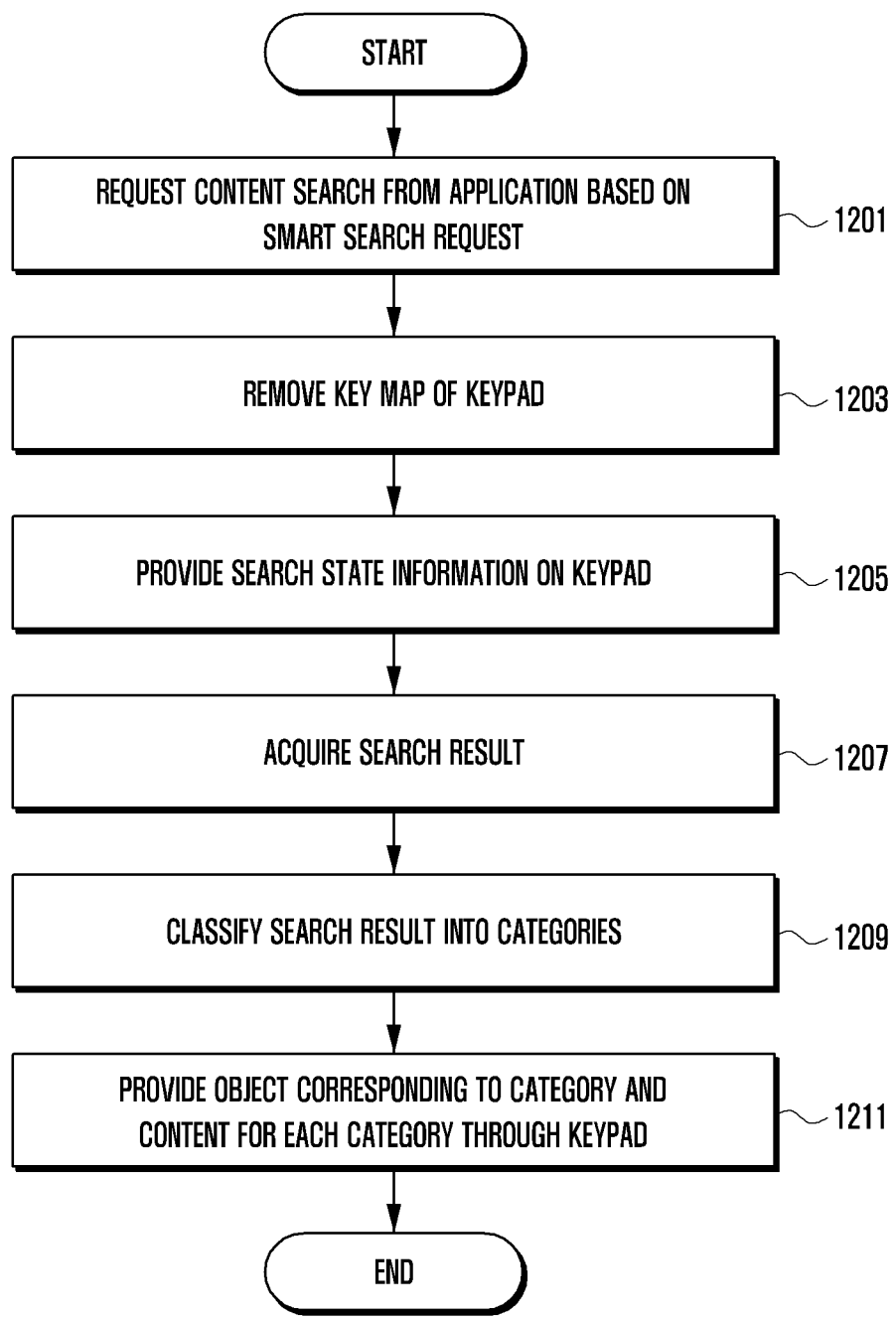
FIG. 12 is a flowchart illustrating the operation of an electronic device according to various embodiments.
Figure 13:
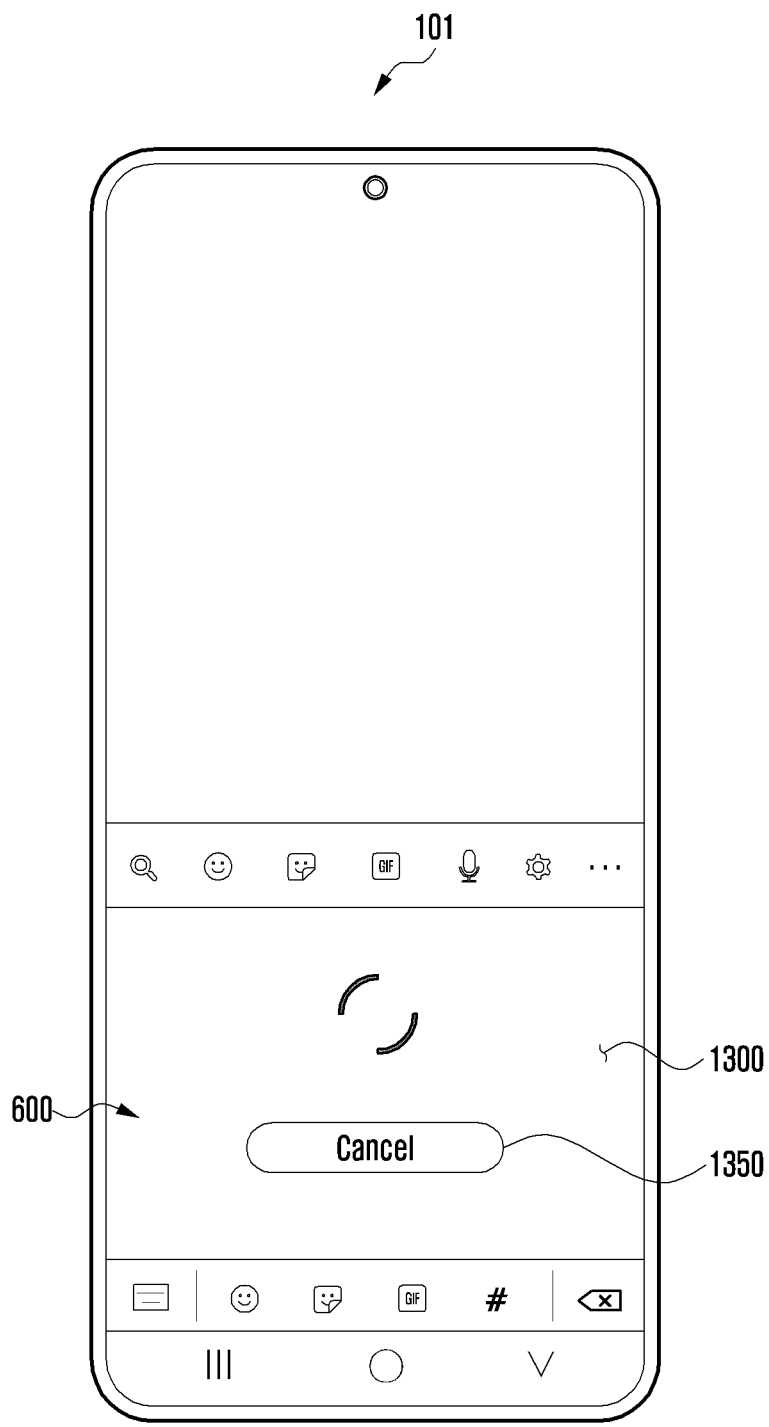
FIG. 13 is a diagram illustrating a part of an operation of providing a search result to a keypad by an electronic device according to various embodiments of the disclosure.

FIG. 12 is a flowchart illustrating the operation of an electronic device according to various embodiments. FIG. 13 is a diagram illustrating a part of an operation of providing a search result to a keypad by an electronic device according to various embodiments of the disclosure.

Operations 1201 to 1211 of FIG. 12 may be implemented with instructions (commands) that may be executed by the processor 120 of the electronic device 101 of FIGS. 1 to 4.

Referring to FIG. 12, in operation 1201, the processor 120 of the electronic device 101 may request a content search from an application based on a smart search (e.g., dynamic content integrated search) request. For example, after detecting a user input related to a keyword and a search command for a smart search based on the keypad 600 while displaying a keypad (e.g., the keypad 600 of FIGS. 6 to 11), the processor 120 may perform a content search using the application. According to an embodiment, the processor 120 may request a content search from at least one application capable of searching for content (or information) among the applications 340 stored (or installed) in the electronic device 101, and may perform the content search in the various applications based on the keyword.

In operation 1203, the processor 120 may remove a key map of the keypad 600. According to an embodiment, when executing a search by one or more applications based on the keyword (or search query), the processor 120 may remove at least a portion of the key map of at least a partial area (or a designated area) of the keypad 600 to provide information related to the content search (e.g., search result) through the keypad 600, and may convert into a view area for content display.

In operation 1205, the processor 120 may provide search status information based on the keypad 600. According to an embodiment, while a search is being performed, the processor 120 may provide a notification related to a search progress state in at least a portion of an area where the key map is removed from the keypad 600. An example of this can be shown in FIG. 13. Referring to FIG. 13, while a content search is performed in various applications of the electronic device 101, the processor 120 may display status information 1300 indicating a content search progress state in a designated area of the keypad 600. According to an embodiment, while a content search is being performed, the processor 120 may display an object 1350 (e.g., a cancel button) related to canceling the search together with the status information 1300 indicating the content search progress state through the display 390. For example, when a user input (e.g., touch) is detected through the object related to the search cancellation, the processor 120 may cancel the ongoing search operation.

In operation 1207, the processor 120 may obtain a search result. According to an embodiment, the processor 120 may obtain the search result from at least one application for which the search is requested.

In operation 1209, the processor 120 may classify the search results into various different categories. According to an embodiment, the processor 120 may classify at least two pieces of content in the search result based on attributes of the content and may group the content with the same attribute. For example, the processor 120 may analyze the attribute of each piece of content acquired from at least one application, and may form a group of the content based on an attribute of each piece of content. According to an embodiment, the content may include various types of content that can be generated by various applications (or services) such as web, emoji, sticker, GIF, tag, contact, gallery, payment Apps, music (e.g., Melon), OTT (e.g., Netflix), VOD (e.g., YouTube), DMB and/or IoT, and the attributes of the content may be classified according to the various services.

According to some embodiments, the processor 120 may classify at least one piece of content of the search result according to the application corresponding to each piece of content, and may group the content. For example, the processor 120 may analyze the attribute of each piece of content acquired from the at least one application and the attribute of the application (e.g., attribute according to a function of an application such as music playback, video playback, gallery, and/or contact), and may group the content according to the attribute of each piece of content and/or attribute of the application.

In operation 1211, the processor 120 may provide an object corresponding to a category and content for the category through the keypad 600. According to an embodiment, the processor 120 may control the keypad 600 and the display 390 to display content searched by at least one application in at least a portion of the keypad 600. According to an embodiment, the processor 120 may display an object (e.g., a category tab) corresponding to the classified category (or application) and content corresponding to the object in the keypad 600.

Figure 14:
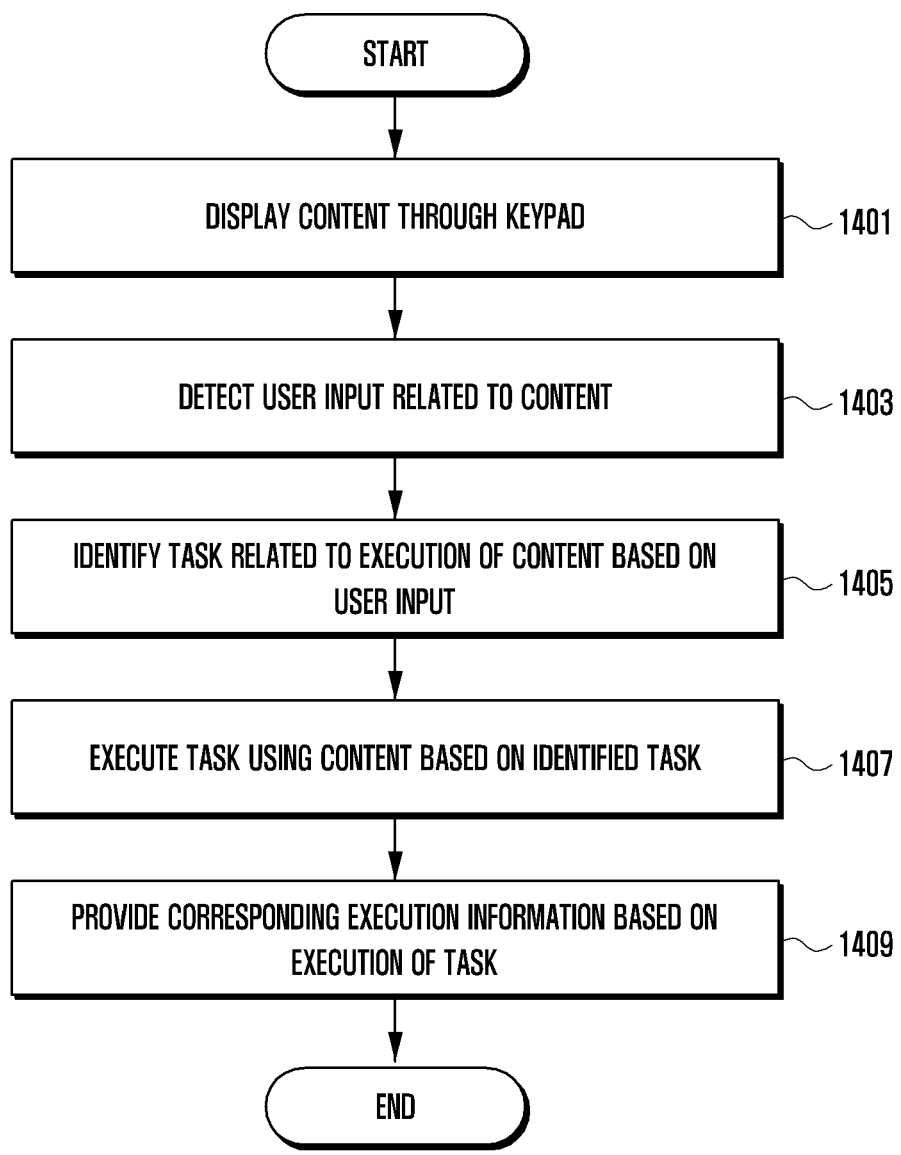
FIG. 14 is a flowchart illustrating the operation of an electronic device according to various embodiments.

FIG. 14 is a flowchart illustrating the operation of an electronic device according to various embodiments.

Operations 1401 to 1409 of FIG. 14 may be implemented with instructions (commands) that may be executed by the processor 120 of the electronic device 101 of FIGS. 1 to 4.

Referring to FIG. 14, in operation 1401, the processor 120 of the electronic device 101 may display content through the keypad 600. For example, the processor 120 may provide content related to an activated object among various objects (e.g., a category object tapped by the user) corresponding to different classified categories as shown in FIGS. 9, 10, and 11, through a designated area of the keypad 600. According to an embodiment, the processor 120 may provide the content in the form of a scrollable list for the object corresponding to the category (e.g., a category object tapped by the user) provided through the keypad 600.

In operation 1403, the processor 120 may detect a user input related to the content. According to an embodiment, the processor 120 may receive a user input (e.g., touch) in the content (or content list) currently displayed through the keypad 600.

In operation 1405, the processor 120 may identify a task (e.g., sharing or executing content) related to the corresponding content based on the user input. For example, the processor 120 may identify whether the task according to the user input is related to a first task for sharing the content with another electronic device or a second task for executing the content on the electronic device 101.

In operation 1407, the processor 120 may execute the task using the corresponding content based on the identified task. For example, the processor 120 may perform an operation according to the first task or may perform an operation according to the second task. According to an embodiment, the operation for each task will be described with reference to the drawings to be described later.

In operation 1409, the processor 120 may provide execution information (or execution screen) corresponding to the task execution. According to an embodiment, the processor 120 may display first execution information related to execution of the first task or second execution information related to execution of the second task through the display 390. According to an embodiment, an example of providing execution information according to the task execution will be described with reference to the accompanying drawings.

Figure 15:
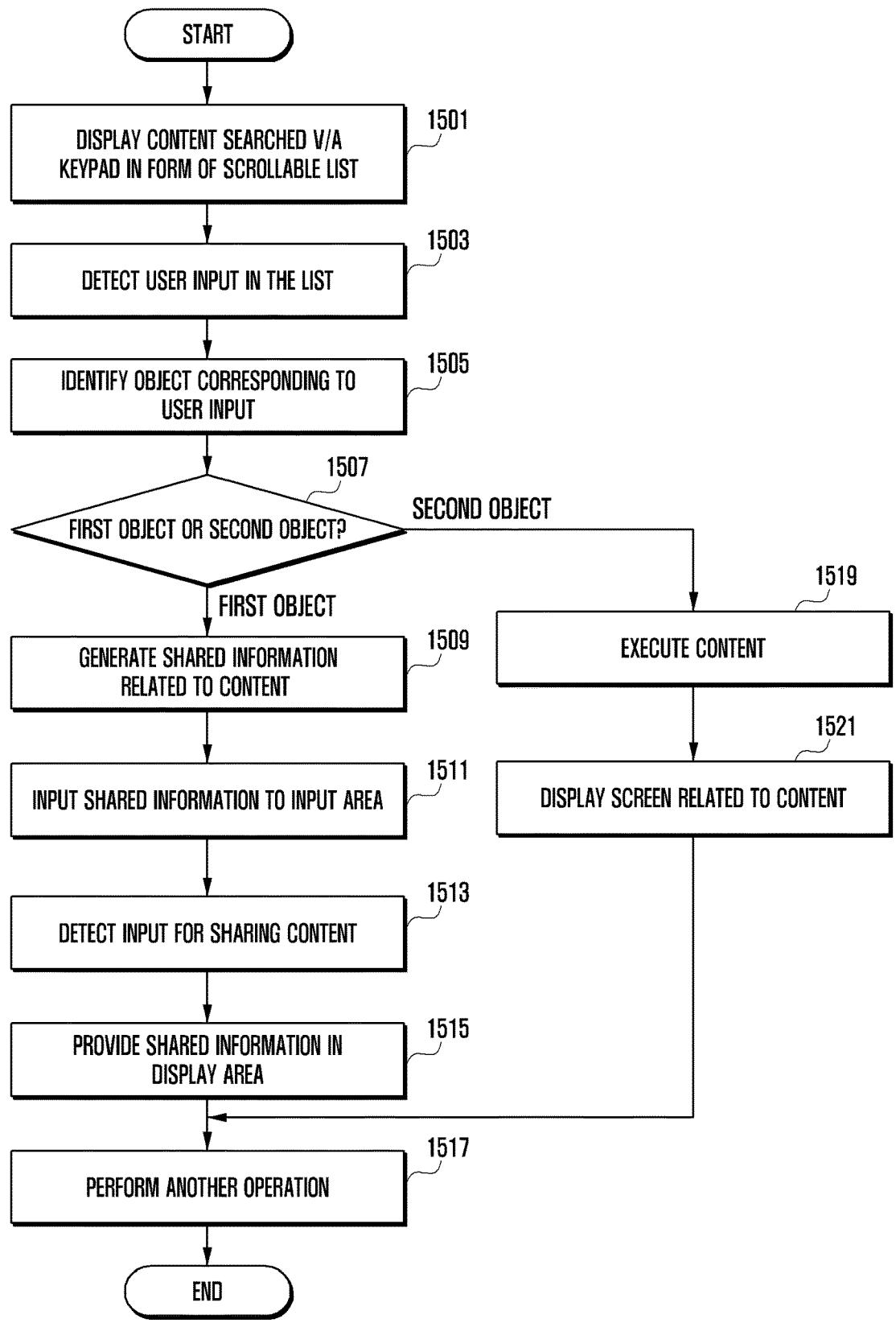
FIG. 15 is a flowchart illustrating an operation of providing content on a keypad in an electronic device according to various embodiments of the disclosure.

FIG. 15 is a flowchart illustrating an operation of providing content on a keypad in an electronic device according to an embodiment of the disclosure. Operations 1501 to 1521 of FIG. 15 may be implemented with instructions (commands) that may be executed by the processor 120 of the electronic device 101 of FIGS. 1 to 4.

Referring to FIG. 15, in operation 1501, the processor 120 of the electronic device 101 may display content searched via the keypad 600 in the form of a scrollable list.

In operation 1503, the processor 120 may detect a user input in the list. According to an embodiment, the processor 120 may detect a user input (e.g., touch) related to task execution using the content currently displayed through the keypad 600, content which corresponds to an activated category object, for example.

In operation 1505, the processor 120 may identify a content object (e.g., image or text) corresponding to the user input. According to an embodiment, the processor 120 may identify an attribute (e.g., content itself {hereinafter, referred to as "first object"} or a button object {hereinafter, referred to as "second object"} for performing the next operation) of an object in the content list corresponding to the point (or position or area) where the user input is detected. According to some embodiments, the processor 120 may determine attributes of the user input (e.g., input methods such as long press, multi-touch, single touch, double tap, and/or flick) and may process a corresponding task according to the attribute of the user input. For example, the processor 120 may perform an operation of the first task in response to a first user input (e.g., a long press), and an operation of the second task in response to a second user input (e.g., a single touch).

In operation 1507, the processor 120 may identify whether the object corresponding to the user input corresponds to the first object or the second object based on the identification result.

In operation 1507, when the object is identified as the first object, the processor 120 may proceed to operation 1509 and may perform operations subsequent to operation 1509. In operation 1507, when the object is identified as the second object, the processor 120 may proceed to operation 1519 and may perform operations subsequent to operation 1519.

In operation 1509, when the first object is identified (or the first user input is identified) in operation 1507, the processor 120 may generate shared information related to the content. According to an embodiment, the shared information related to the content may include various types of data used for sharing the content with an external electronic device (e.g., another electronic device and/or server {e.g., cloud}), such as an image file, a video file, a graphic object (e.g., emoji, bitmoji, GIF) file, a music file, and/or a link (e.g., uniform resource identifier (URI), uniform resource locator (URL), or uniform resource name (URN)), which may be generated according to the attribute of the content.

In operation 1511, the processor 120 may provide (e.g., display or insert) the shared information by inputting the shared information into the input area 620 (or an input window) of the keypad 600. According to an embodiment, the processor 120 may insert shared information in a suitable format (e.g., image format and/or text format) into the input area 620 according to the attribute of the content.

In operation 1513, the processor 120 may detect an input for sharing content. According to an embodiment, the processor 120 may insert the shared information into the input area 620 of the keypad 600, and may detect a user input for sharing (e.g., a send button) provided in the input area 620. According to an embodiment, the processor 120 may maintain the display of the content (or a content list) through the keypad 600 while operation 1513 is being performed.

In operation 1515, the processor 120 may provide (or display) the shared information on a display area. According to an embodiment, the processor 120 may transmit (or share) the content selected by the user to an external device (e.g., another electronic device or server) and may provide the shared information related to the transmitted content on the display area in a corresponding format (e.g., downloadable data type and/or link format). For example, in a chat application, when a user is chatting with at least one chat partner, the processor 120 may share the content with a server related to the chatting application, may display the shared information related to the shared content on the display area (e.g., a chat window), and may allow the at least one chat partner to acquire (e.g., download) the content in its electronic device. According to an embodiment, the processor 120 may maintain the display of the content (or content list) through the keypad 600 while operation 1515 is being performed.

In operation 1517, the processor 120 may perform a corresponding operation based on another user input after the operation of sharing the content. For example, the processor 120 may continue the operation of sharing content to share another piece of content provided through the keypad 600 based on another user input, or may stop displaying the content of the keypad 600 based on a user input (e.g., stops the smart search mode), and may convert to the keypad 600 for key input and display the key map on the key map area 640.

In operation 1519, when identifying the second object (or identifying the second user input) in operation 1507, the processor 120 may execute the content. According to an embodiment, the processor 120 may identify and execute the application capable of executing the content according to the attribute of the content, and may execute the content based on the executed application.

In operation 1521, the processor 120 may display a screen related to the content. According to an embodiment, the processor 120 may remove the display of the keypad 600 and may provide the execution screen including the content in the display 390 based on the execution of the corresponding application.

In operation 1517, the processor 120 may perform a corresponding operation based on another user input after the execution operation on the content. For example, the processor 120 may reactivate the keypad 600 based on a user input and may display the reactivated keypad 600 on the display 390, or may perform an operation according to a function executable by the executed application.

Figure 16A:
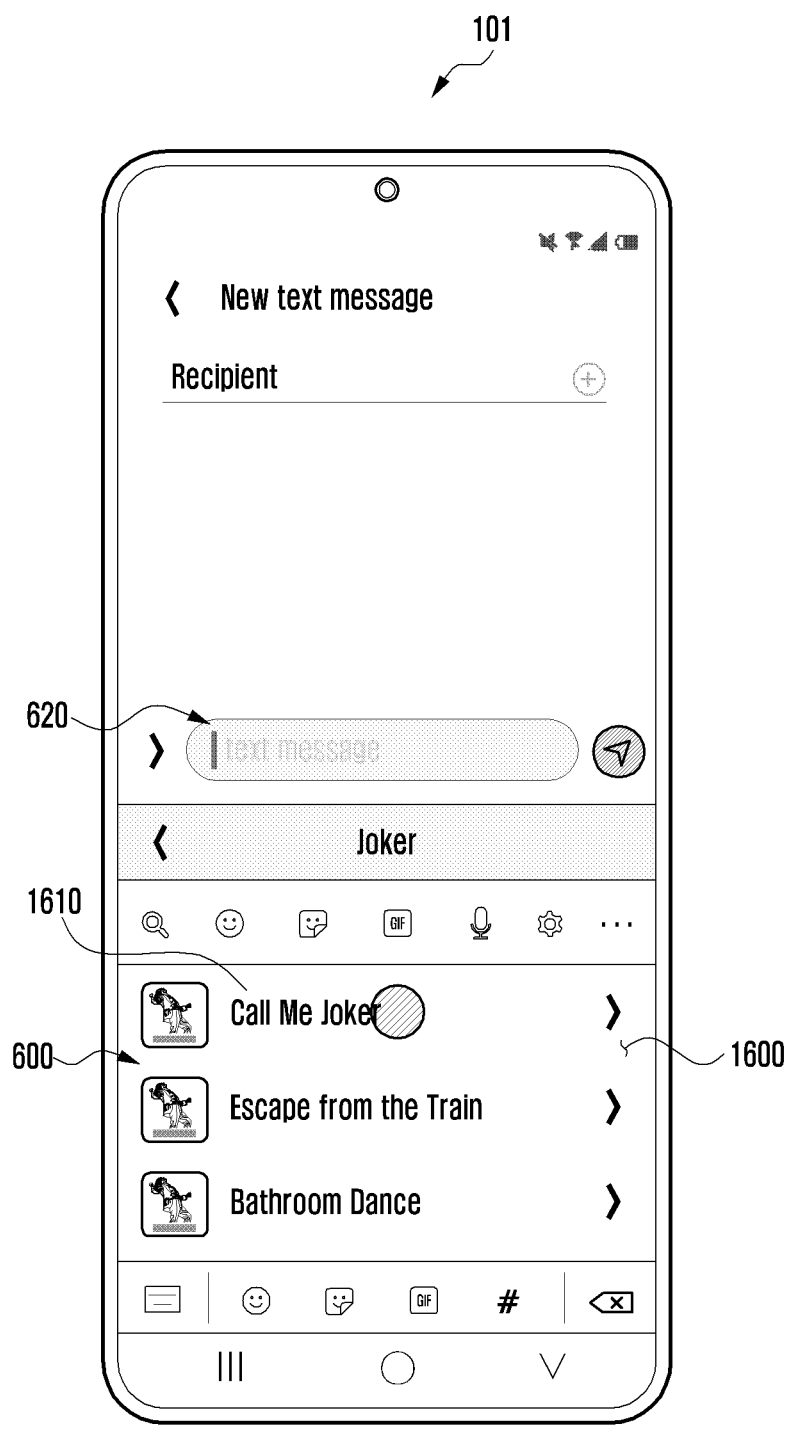
FIGS. 16A, 16B, and 16C are diagrams illustrating an example operation of content provided on a keypad in an electronic device according to various embodiments of the disclosure.
Figure 16B:
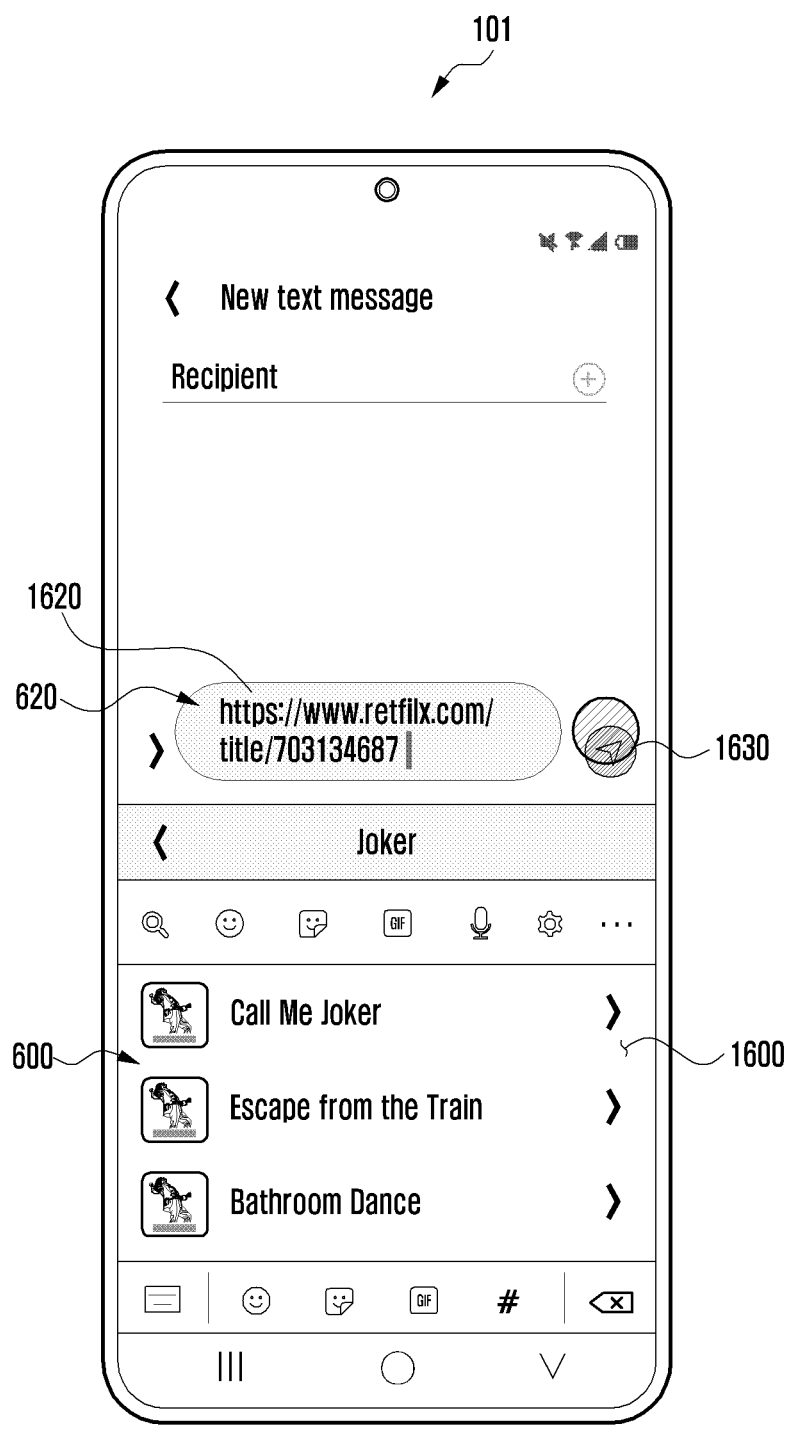
Figure 16C:
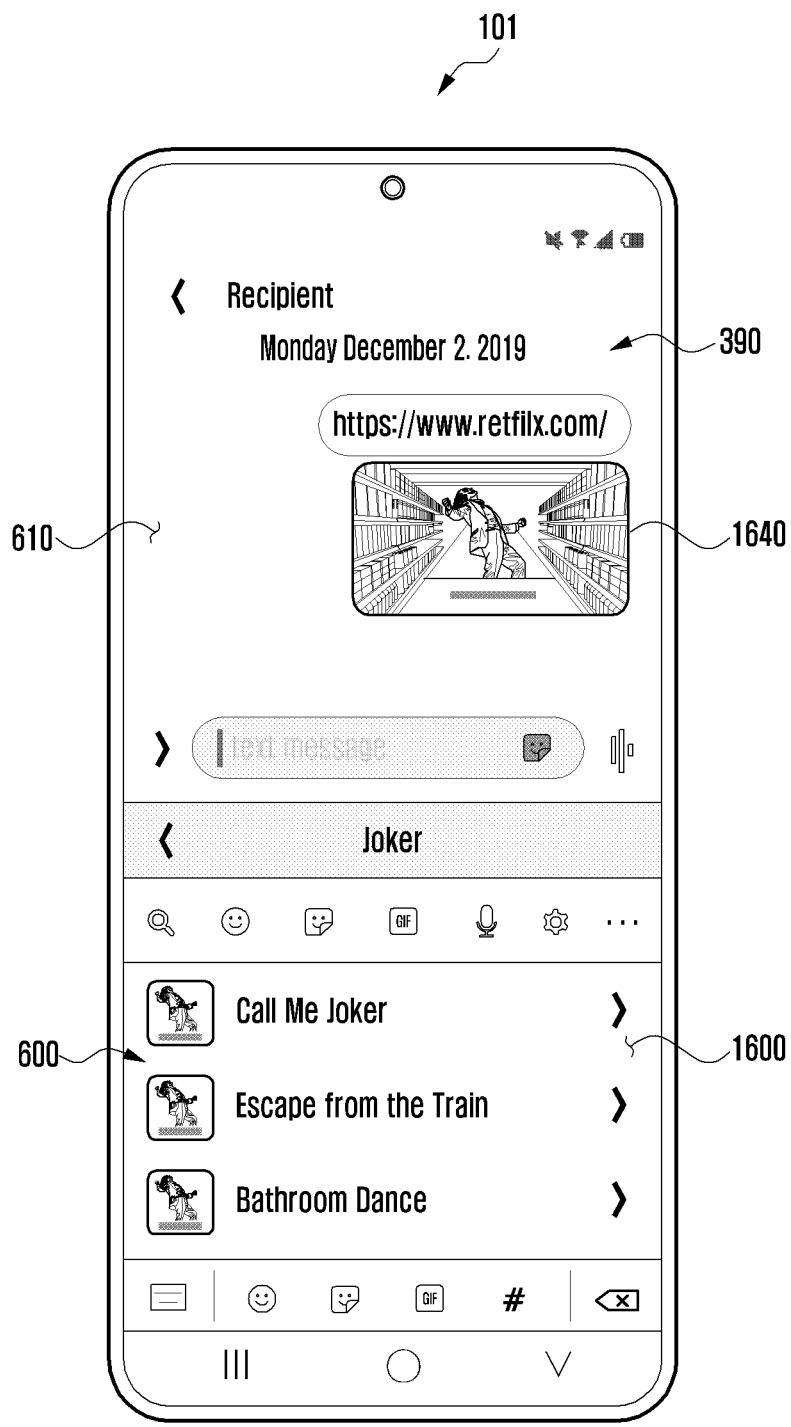

FIGS. 16A, 16B, and 16C are diagrams illustrating an example operation of content provided on a keypad in an electronic device according to various embodiments of the disclosure.

According to an embodiment, FIGS. 16A, 16B, and 16C illustrate an example of an operation of transmitting and sharing selected content based on a user input (e.g., touch), the user input being related to task execution for content displayed on the keypad 600.

Referring to FIG. 16A, the electronic device 101 may provide a search result 1600 of the content through the keypad 600. For example, the electronic device 101 may provide content searched via the keypad 600 in the form of a scrollable list. According to an embodiment, the electronic device 101 may transmit and share selected content 1610 based on a user input while the search result 1600 of the content is displayed through the keypad 600. According to an embodiment, as illustrated in FIG. 16A, when an attribute of an object corresponding to the point (or position or area) where the user input is detected in the search result 1600 (e.g., list) displayed through the keypad 600 is, for example, the first object (e.g., content itself), the electronic device 101 may identify the first object as a task of transmitting and sharing the selected content 1610.

According to an embodiment, the electronic device 101 may generate shared information 1620 related to the content based on a user input of selecting (e.g., touching) the content in the search result 1600. For example, the shared information 1620 related to the content may include various types of data used for sharing the content with an external electronic device (e.g., another electronic device and/or server), such as an image file, a video file, a graphic object file, a music file, and/or a link (e.g., URI), generated according to the attribute of the content.

As shown in FIG. 16B, the electronic device 101 may provide (or display or insert) at least a part or all of the shared information 1620 related to the content by inputting the same into the input area 620. According to an embodiment, the electronic device 101 may insert the shared information in a corresponding format (e.g., an image format and/or a text format) into the input area 620 according to the attribute of the content. According to an embodiment, the electronic device 101 may provide a link related to the selected content 1610 through the input area 620. According to an embodiment, while displaying the shared information 1620 through the input area 620, the electronic device 101 may detect a user input in which a transmission object 1630 for sharing content is selected (e.g., touched).

As shown in FIG. 16C, when a user input is detected by a transmission object 1630 in a state in which the shared information 1620 (e.g., at least partial shared information) is input to the input area 620, the electronic device 101 may provide (e.g., display) the shared information 1640 (e.g., entire shared information or processed shared information) on the execution screen 610 (e.g., display area) displayed through the display 390 to share the corresponding content with another electronic device (or another user). According to an embodiment, the electronic device 101 may maintain the display state of the search result 1600 through the keypad 600 while performing the operation of sharing the content.

Figure 17A:
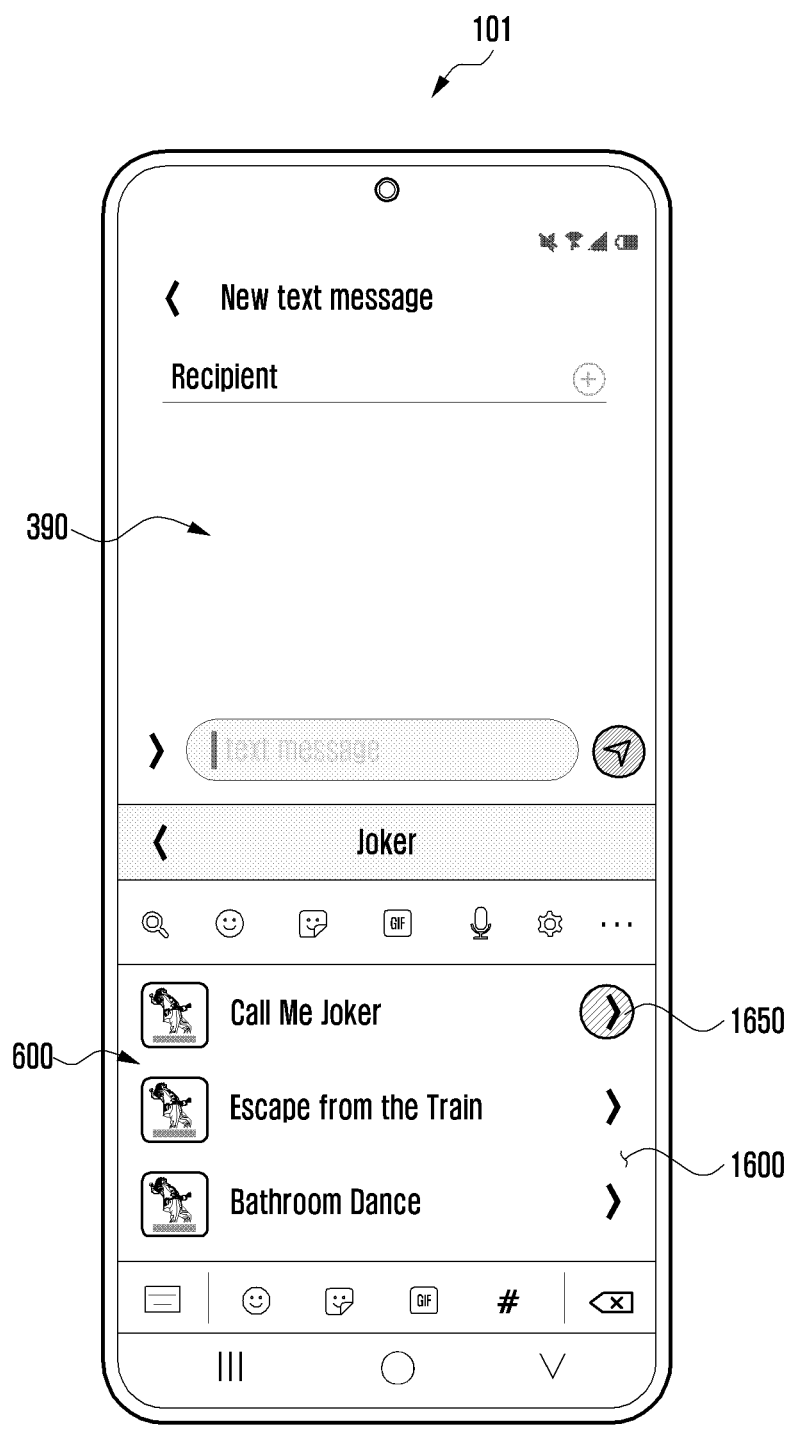
FIGS. 17A and 17B are diagrams illustrating an example operation of content provided on a keypad in an electronic device according to various embodiments of the disclosure.
Figure 17B:
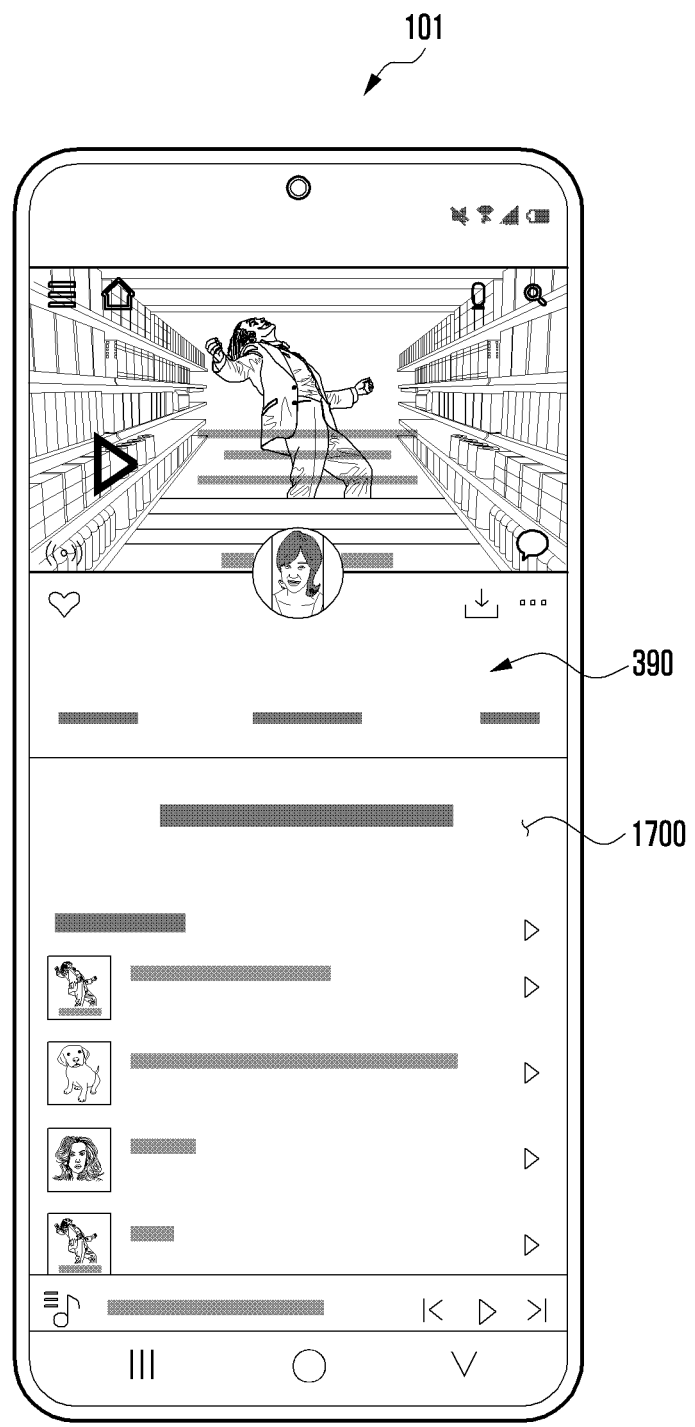

FIGS. 17A and 17B are diagrams illustrating an example operation of content provided on a keypad in an electronic device according to various embodiments of the disclosure.

According to an embodiment, FIGS. 17A and 17B illustrate an example of an operation of executing and displaying content selected based on a user input (e.g., touch), the user input being related to task execution for content displayed on the keypad 600.

Referring to FIG. 17A, the electronic device 101 may provide the content search result 1600 through the keypad 600. For example, the electronic device 101 may provide the content searched on the keypad 600 in a scrollable list format. According to an embodiment, the electronic device 101 may perform an operation of executing and displaying the selected content based on the user input while displaying the content search result 1600 on the keypad 600. According to an embodiment, as illustrated in FIG. 17A, when an attribute of an object corresponding to the point (or position or area) where the user input is detected on the search result 1600 (e.g., list) displayed through the keypad 600 is, for example, the second object (e.g., the button object 1650 for processing the next operation), the electronic device 101 may identify the second object as a task of executing the selected content.

According to an embodiment, based on a user input of selecting (e.g., touching) the button object 1650 from the search result 1600, the electronic device 101 may identify and execute an application capable of executing the corresponding content (e.g., the selected content) according to the attribute of the content. For example, the electronic device 101 may execute an application capable of executing (e.g., play) the content and may execute the content based on the executed application.

As shown in FIG. 17B, based on the execution of the application, the electronic device 101 may display an execution screen 1700 related to the content (e.g., an execution screen of an application in which the content is executed) on the display 390. According to an embodiment, the electronic device 101 may remove the display of the keypad 600 (or the result screen 1600) from the display 390, and may provide the execution screen 1700 including the content based on the execution of the application through the display 390.

According to an embodiment, while maintaining the keypad 600 displayed through the display 390, the electronic device 101 may display the execution screen 1700 including the content based on the execution of the application by overlapping at least some of the execution screen 1700, or may provide the execution screen 1700 in an independent area (or window) distinguishing from the keypad 600.

Figure 18:
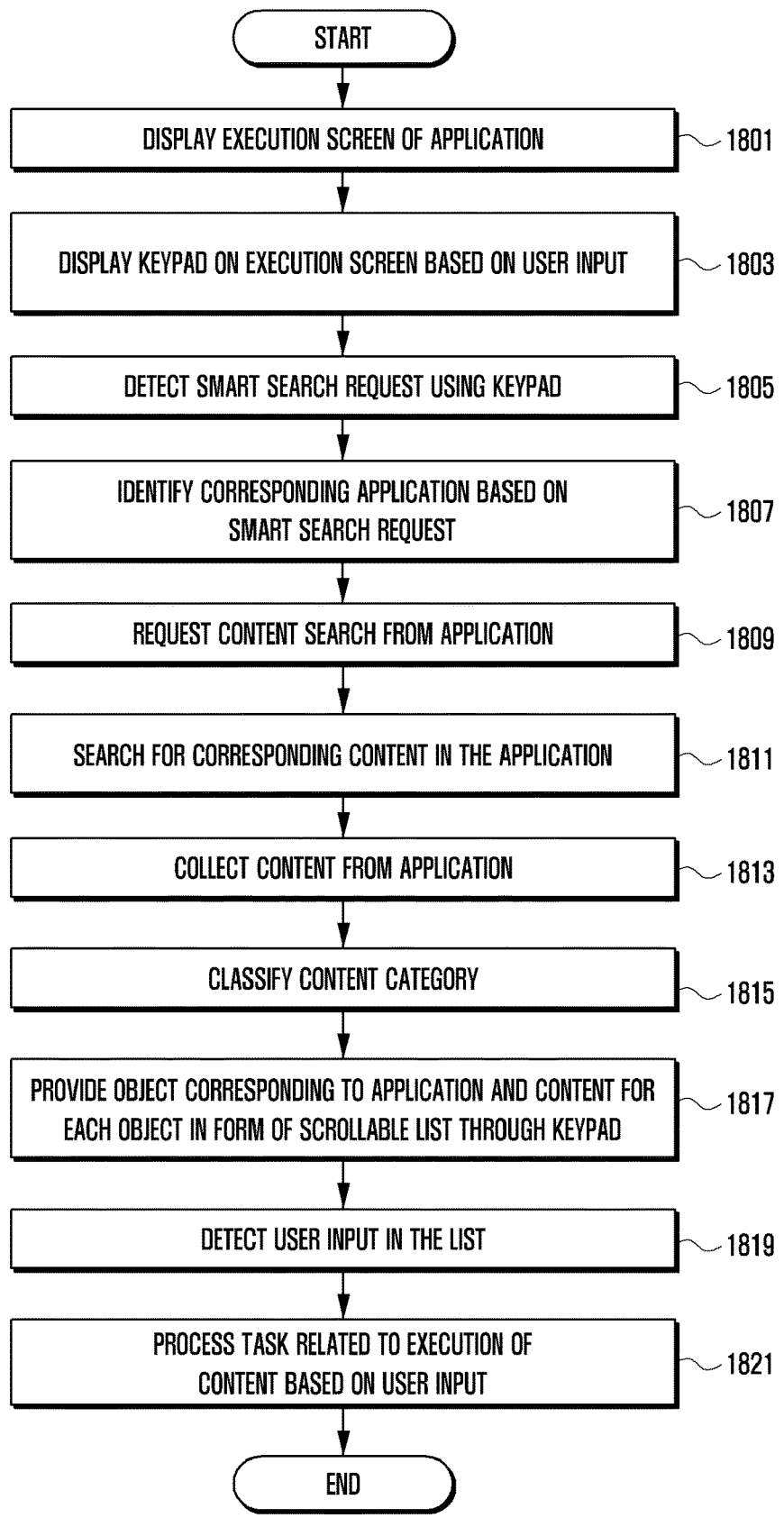
FIG. 18 is a flowchart illustrating an operation of an electronic device according to various embodiments.

FIG. 18 is a flowchart illustrating an operation of an electronic device according to various embodiments.

Operations 1801 to 1821 of FIG. 18 may be implemented with instructions (commands) that may be executed by the processor 120 of the electronic device 101 of FIGS. 1 to 4.

Referring to FIG. 18, in operation 1801, the processor 120 of the electronic device 101 may display the execution screen of the application through the display 390.

In operation 1803, while displaying the execution screen of the application, the processor 120 may display the keypad on the execution screen of the application based on the user input. According to an embodiment, the processor 120 may detect the user input for a keypad call (e.g., a voice command and/or a touch command). According to an embodiment, the processor 120 may control the display 390 to display the keypad on at least a partial area on the execution screen by calling up the keypad based on detecting the user input for calling the keypad.

In operation 1805, the processor 120 may detect a request for a smart search (e.g., integrated dynamic content search) using the keypad. According to an embodiment, the processor 120 may detect a keyword and a search command related to the smart search (e.g., a voice command and/or a touch command) while displaying the keypad through the display 390.

In operation 1807, the processor 120 may identify a corresponding application based on the smart search request. According to an embodiment, the application may be various applications such as Internet browser, video (or video playback) application, music (or music playback) application, communication connection application, game application, contact application, document application, messenger application, gallery application, message application, memo (or note) application, file management application, voice recording application, recording application, etc. According to an embodiment, the processor 120 may analyze a search keyword (or a search query) of the smart search request, and may identify an application capable of searching for the content related to the keyword based on the analyzed result.

In operation 1809, the processor 120 may request a content search from a corresponding application. According to an embodiment, the processor 120 may perform an application-related content search based on the keyword (or the search query) in the corresponding application and may obtain the search result.

In operation 1811, the processor 120 may search for corresponding content based on the application. According to an embodiment, the processor 120 may perform a search (e.g., internal search or external search) based on the attribute (e.g., content search attribute in the electronic device 101 or external (e.g., web) content search attribute) of the corresponding application in the background. According to an embodiment, the processor 120 may perform the content search in the corresponding application based on a designated keyword (or a search query).

In operation 1813, the processor 120 may collect the content from the application. According to an embodiment, the processor 120 may collect (or gather) search results (e.g., dynamic content) from each application. According to an embodiment, the processor 120 may directly retrieve the search result for the keyword through a provider and/or an API call for each application, and/or may retrieve the search result for the keyword through a search engine provided by a finder module.

In operation 1815, the processor 120 may classify the categories of the content. According to an embodiment, the processor 120 may classify the collected content (e.g., dynamic content) based on the content attribute and may group the content with the same attribute. For example, the processor 120 may analyze an attribute of each content acquired from at least one application, and may form a group of the content from each application for each attribute according to the attribute of every piece of content. According to some embodiments, the processor 120 may classify the collected content from the applications and may group the content. For example, the processor 120 may analyze the attribute of each piece of content acquired from the at least one application and the attribute of the application (e.g., attribute according to a function of an application such as music playback, video playback, gallery, and/or contact), and may group the content of each application according to the attribute of each piece of content and/or the attribute of each application.

In operation 1817, the processor 120 may provide an object corresponding to the application and content for each object in a scrollable list format through the keypad. For example, the processor 120 may display the searched content through a keypad. According to an embodiment, the processor 120 may control the keypad and the display 390 to display the content (e.g., dynamic content) searched by the applications in at least a portion of the keypad. According to an embodiment, the processor 120 may display an object (e.g., a category tab, a tab menu, or a group object) and content corresponding to the category in the keypad. According to an embodiment, the processor 120 may display content in at least a portion of the keypad, organized based on objects (e.g., category tap, tap menu, or group object) for each category (or group) according to the classification of the content related to the keyword. According to an embodiment, the processor 120 may provide the content in the form of a scrollable list.

In operation 1819, the processor 120 may detect the user input in the list. According to an embodiment, the processor 120 may detect the user input (e.g., touch) related to task execution of the content from content (or a content list) corresponding to a designated object activated through the keypad.

In operation 1821, the processor 120 may process a task related to execution of the content based on the user input. According to an embodiment, when the user input is received based on the content provided through the keypad, the processor 120 may process a task related to the corresponding content (e.g., sharing or executing content) based on the user input. According to an embodiment, the processor 120 may identify a task (e.g., sharing or content execution) related to the execution of the corresponding content, based on the user input. For example, the processor 120 may identify whether the task based on the user input is related to a first task that shares the content with another electronic device or a second task that executes the content on the electronic device 101. According to an embodiment, the processor 120 may execute the task using the corresponding content based on the identified task. For example, the processor 120 may perform an operation according to the first task or may perform an operation according to the second task.

Figure 19A:
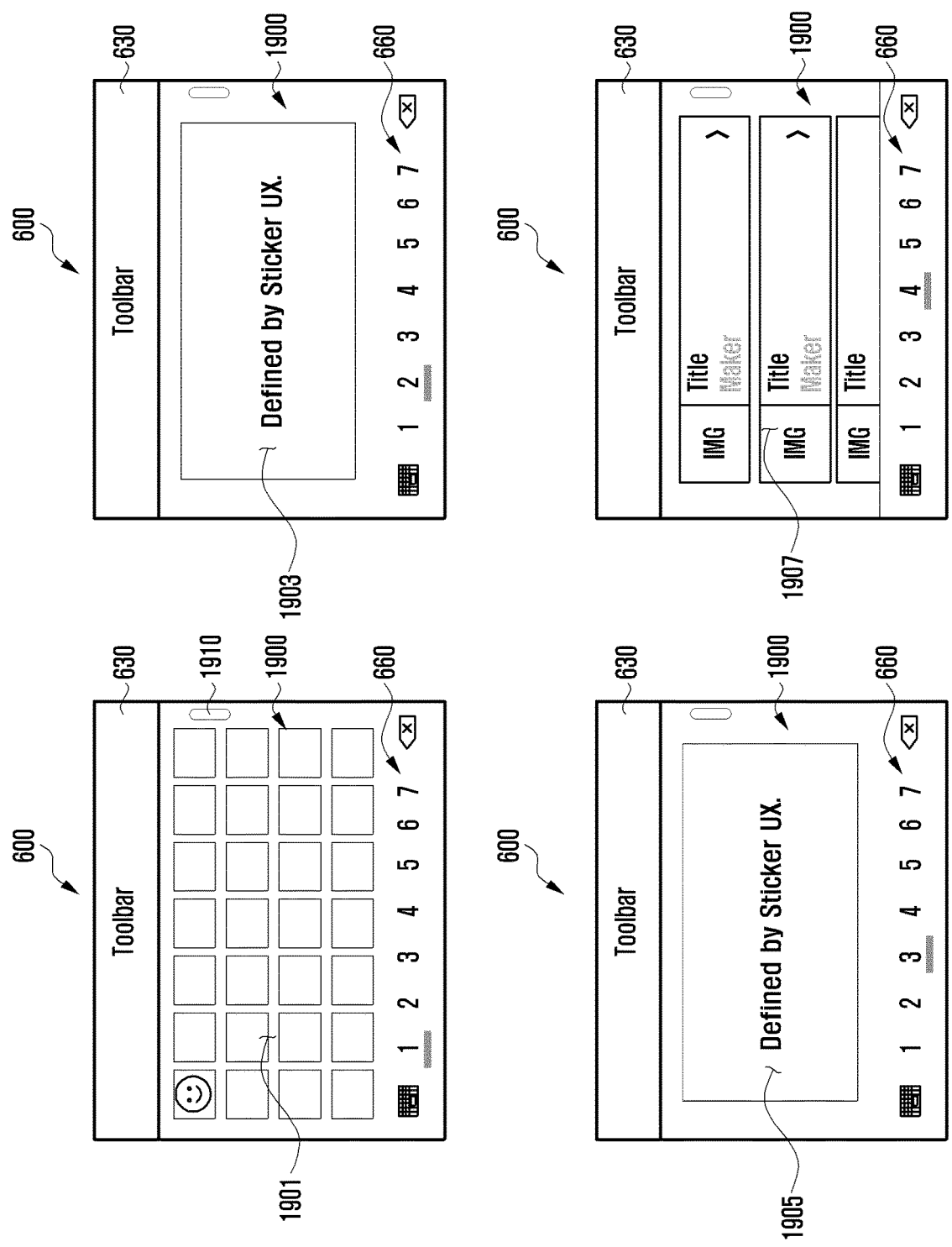
FIGS. 19A and 19B are diagrams illustrating an example of providing a search result using a keypad in an electronic device according to various embodiments of the disclosure.
Figure 19B:
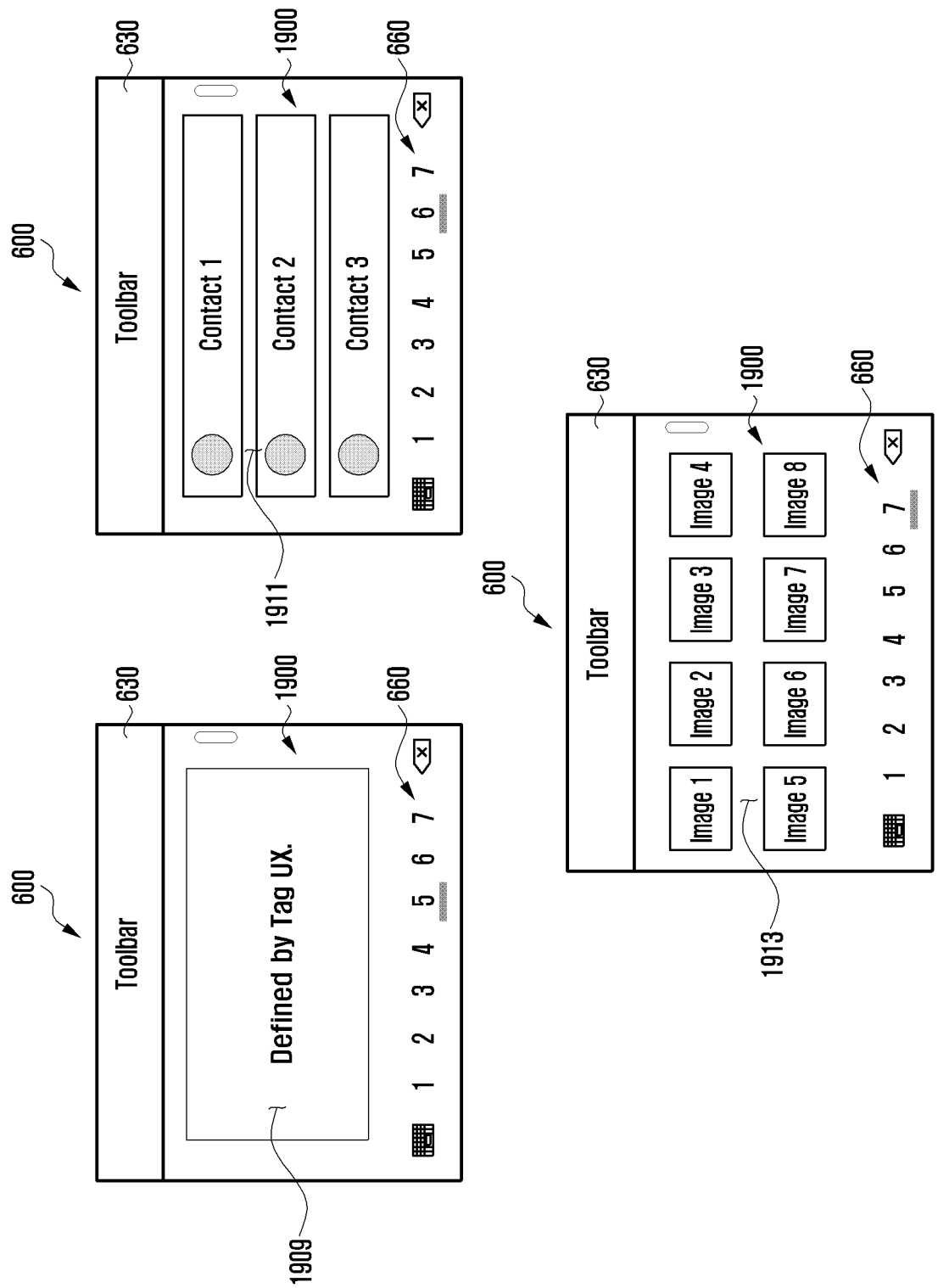

FIGS. 19A and 19B are diagrams illustrating an example of providing a search result using a keypad in an electronic device according to various embodiments of the disclosure.

According to an embodiment, in FIGS. 19A and 19B, an example of providing an object corresponding to a classified category (e.g., a category tab, a tab menu, or a group object) and searched content based on each object is illustrated. For example, in FIGS. 19A and 19B, an example in which the keypad 600 provides a search result based on category classification may be shown.

As shown in FIGS. 19A and 19B, the keypad 600 may include an interface such as the toolbar area 630 and the view area 1900 for displaying content (e.g., the key map area 640).

According to an embodiment, the electronic device 101 may perform a search of one or more applications based on a keyword (or a search query) in a plurality of applications for which a content search is requested, may obtain a search result from at least one application among the plurality of applications, and may provide the acquired search content through the keypad 600. According to an embodiment, the electronic device 101 may classify the search result into categories, and may provide objects corresponding to the categories (e.g., category tabs) and the searched content through the keypad 600. According to an embodiment, the keypad 600 may provide content of the corresponding object in a vertically and/or horizontally scrollable list format in a designated view area 1900 for displaying content, and may provide the objects corresponding to the categories through a designated category area 660 (e.g., a lower end of the view area 1900) of the keypad 600.

According to an embodiment, the objects in the category area 660 may be generated to correspond to the number of categories to be classified or the number of applications for which the search is performed. According to an embodiment, the objects arranged in the category area 660 may be arranged by a designated number (e.g., 5 or 7 objects) of the objects, and may be configured to be horizontally scrollable when the number of the objects exceeds the designated number. According to an embodiment, the objects of the category area 660 may be provided in various formats such as number format, text format, or icon format. For example, the objects may be provided as representative icons indicating the category or application. According to some embodiments, the category area 660 may further include an object (e.g., all objects) capable of displaying all search results in addition to the objects corresponding to the categories.

According to an embodiment, the order of arrangement of the objects included in the category area 660 may be provided sequentially and may be at least based on, for example, the order of names, the order of user-specified preferences, the order of recently used applications, or the order in which search results are obtained. According to an embodiment, in FIGS. 19A and 19B, the search result 1901 of the first object (or the first category or the first application) to the search result 1913 of a seventh object according to a user's screen change (or scroll or object selection) is sequentially illustrated. According to an embodiment, search results 1901, 1903, 1905, 1907, 1909, 1911, and 1913 provided in the view area 1900 of the keypad 600 may be search results that are classified for each object in the category area 660, and may be provided in another method according to the attributes of the content as shown in Table 1. For example, the search results 1901, 1903, 1905, 1907, 1909, 1911, and 1913 may be provided in the form of a scrollable list of horizontal or vertical arrangement based on at least some of icons, text, and/or images (e.g., thumbnails) according to the attributes of the content.

According to some embodiments, an object in the objects of the category area 660 of the keypad 600 that does not have corresponding search results may be dimmed. This way, the dimmed object may be distinguished from other objects. In some embodiments, the electronic device 101 may operate so as not to provide the object that does not have corresponding search results in the category area 660. According to an embodiment, the category area 660 and the view area 1900 of the keypad 600 may be provided in various ways according to a configuration of the electronic device 101 by the user. For example, the category area 660 and the view area 1900 of the keypad 600 may be configured and provided in various ways based on user customization.

FIG. 20 is a diagram illustrating an example of providing a search result using a keypad in an electronic device according to various embodiments of the disclosure.

According to an embodiment, in FIG. 20, when there is no search result in the at least one application for various reasons (e.g., not searched, language not supported, and/or time-out error), various examples in which feedback (or text and/or image status information) related to the non-search result is provided through the view area 1900 is illustrated.

According to an embodiment, when there is no search result by the at least one application, the electronic device 101 may provide a feedback 2010 indicating that the content is not found on a search result screen of the corresponding application (e.g., corresponding object). For example, the electronic device 101 may provide the feedback 2010 indicating that the content by the corresponding application is not found, such as "No results found" through the view area 1900 of the keypad 600.

According to an embodiment, when the keyword in the search query is in a language not supported by at least one application, the electronic device 101 may provide a feedback 2020 indicating that the search is not performed due to the language being unsupported. The feedback 2020 may be displayed on a search result screen of the application (e.g., a corresponding object). For example, the electronic device 101 may provide the feedback 2020 indicating that "Can't search % s in the current input language" because the language of the keyword is not supported, through the view area 1900 of the keypad 600. Here, "% s" is a placeholder for the keyword that was entered by the user.

According to an embodiment, when timeout occurs in the content search in the at least one application, the electronic device 101 may provide a feedback 2030 indicating that a timeout error due to exceeding of search time is generated on the search result screen of the corresponding application (e.g., corresponding object). For example, when timeout occurs by searching for a number of pieces of information such as a contact, the electronic device 101 may provide the feedback 2030 regarding the occurrence of the error as shown in "Couldn't load contacts" through the view area 1900 of the keypad 600.

Figure 21:
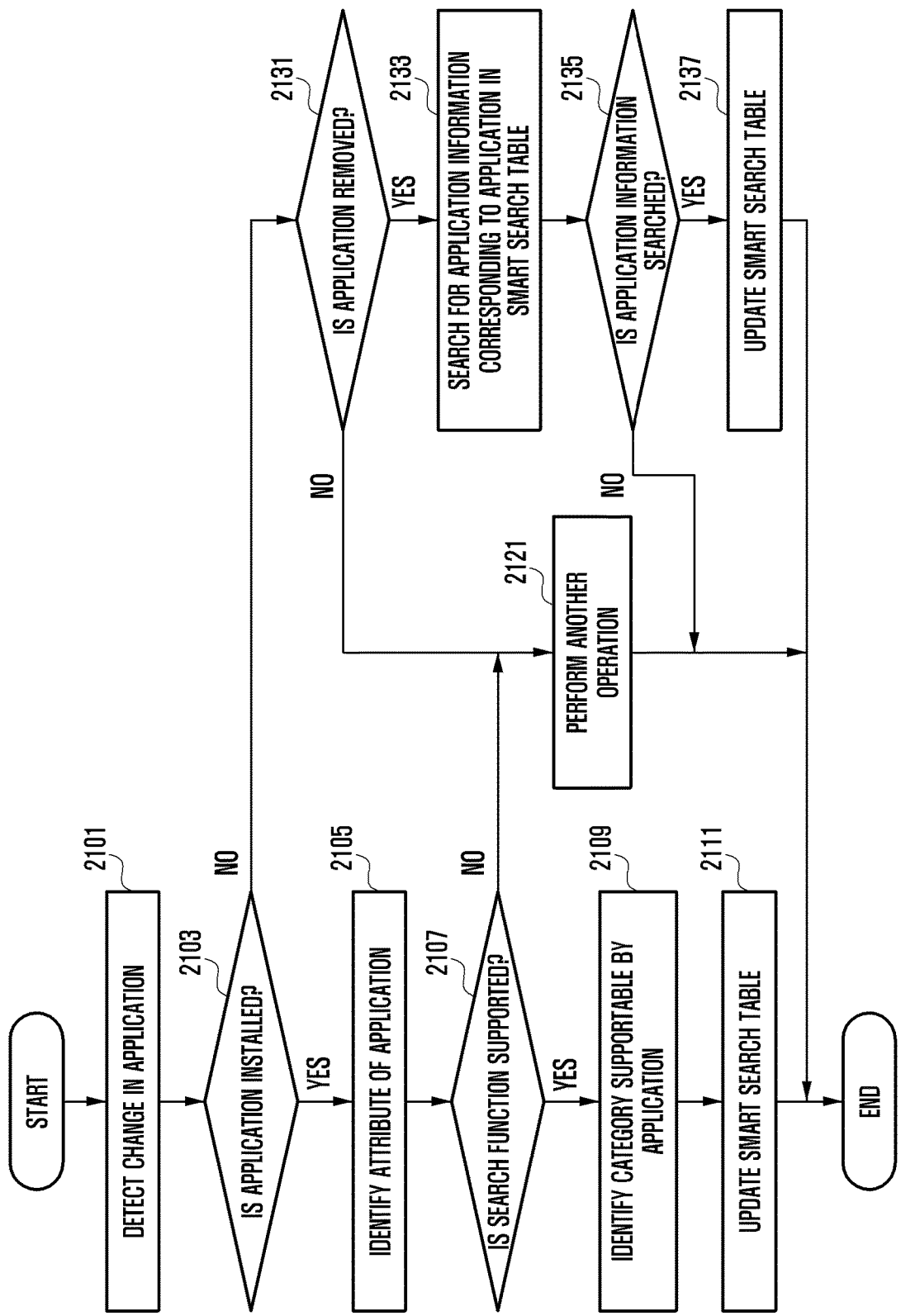
FIG. 21 is a flowchart illustrating the operation of an electronic device according to various embodiments.

FIG. 21 is a flowchart illustrating the operation of an electronic device according to various embodiments.

Operations 2101 to 2137 of FIG. 21 may be implemented with instructions (commands) that may be executed by the processor 120 of the electronic device 101 of FIGS. 1 to 4.

According to an embodiment, in FIG. 21, an example operation of updating the configuration of an integrated search when a change (e.g., install or remove) in the applications in the electronic device 101 has occurred may be shown. According to an embodiment, when an application is installed, the electronic device 101 may automatically configure to support the smart search (or integrated search) using a plug-in technique that does not require modification (or additional configuration) of the keypad for using the search function in the application. For example, the electronic device 101 may provide an integrated search of various types of contents by various applications (e.g., including a 3rd party application) installed in the electronic device 101. According to an embodiment, in the case of the 3rd party application, when installed in the electronic device 101, it may be automatically configured to provide integrated search using the keypad by interworking with the keypad as a plug-in.

Referring to FIG. 21, in operation 2101, the processor 120 of the electronic device 101 may detect a change in the applications. According to an embodiment, the processor 120 may detect a trigger for changing the applications based on the installation of an application on the electronic device 101 or a removal of the application installed on the electronic device 101.

In operation 2103, the processor 120 may determine whether the application change corresponds to an application installation based on the detection of the change in the application.

In operation 2103, when the change in the applications is an application installation (e.g., "Yes" in operation 2103), in operation 2105, the processor 120 may identify an attribute of the application.

In operation 2107, the processor 120 may determine whether the corresponding application supports the search function based on the result of determining the attribute of the application. For example, the processor 120 may identify whether the corresponding application is a search supported application or a search non-supported application based on the attribute of the installed application. According to an embodiment, the search supported application (e.g., messenger application, browser application, or photo application) may be an application that generates and stores data on its own and one that supports searching for the data by interworking (or accessing) with an external electronic device (e.g., web server or cloud). According to an embodiment, the search non-supported application (e.g., game application or configuration application) may be an application that does not generate and store data on its own, one that registers data in an external electronic device (e.g., server), and one that can identify data only within itself. In addition, the search non-supported application may be one that requires personal information protection (e.g., a financial application).

When the application is the search non-supported application (e.g., "NO" in operation 2107) that does not support the search function in operation 2107, in operation 2121, the processor 120 may perform a corresponding operation. According to an embodiment, the processor 120 may process a general installation operation and/or an operation according to a user operation without an interworking operation with the keypad for the integrated search support by the installed application.

When the application is the search supported application that supports the search function (e.g., "YES" in operation 2107) in operation 2107, in operation 2109, the processor 120 may identify at least one category supportable by the installed application. For example, the processor 120 may identify the attribute (attributes of web, image {e.g., emoji, sticker, GIF, bitmoji, or photo}, music, and/or video) of the content that can be searched by the installed application.

In operation 2111, the processor 120 may update a smart search table based on a result obtained by identifying the category. For example, the processor 120 may additionally configure at least one piece of information (e.g., application information, application execution path, and/or information related to the category) related to the installed application, in the smart search table. According to an embodiment, the processor 120 may store and manage the smart search table (or database or look-up table) in the memory 130 to provide an integrated search using the keypad by interlocking with the keypad. According to an embodiment, the processor 120 may provide the application (e.g., including $3^{rd}$ party application) as a plug-in to the keypad based on the smart search table, and the application may interwork with the keypad to perform integrated search without needing additional configuration.

When the change in the application is not the application installation (e.g., "NO" in operation 2103) in operation 2131, the processor 120 may determine whether the change in the application corresponds to a removal of the application.

When the change in the application is the removal of the application (e.g., "YES" in operation 2131) in operation 2131, in operation 2133, the processor 120 may search for application information corresponding to the application removed in the smart search table.

In operation 2135, the processor 120 may identify whether the application information corresponding to the smart search table is searched (or exists) based on the search result of the application information.

When the application information of the removed application is not found (or does not exist) in the smart search table (e.g., "NO" in operation 2135) in operation 2135, the processor 120 may perform another operation. According to an embodiment, the processor 120 may control the electronic device 101 to perform an operation related to the user input (or operation) after removing the corresponding application without an additional operation related to the smart search operation.

When the application information of the removed application is found in the smart search table (or does exist) in operation 2135 ("YES" in operation 2135), in operation 2137, the processor 120 may update the smart search table. For example, the processor 120 may remove at least one piece of information (e.g., application information, application execution path, and/or information related to the category) related to the removed application, from the smart search table. According to an embodiment, the processor 120 may remove the corresponding application information according to the removal of the application or the user configuration from the smart search table (or database or look-up table) configured to provide an integrated search using the keypad, thereby preventing a search by the corresponding application from being performed.

When the change in the application is not the removal of the application in operation 2131 (e.g., "NO" in operation 2131), in operation 2121, the processor 120 may perform another operation. According to an embodiment, when the change in the application is not the installation of the application and the removal of the application, the processor 120 may control the electronic device 101 to perform an operation related to the change in the application without an additional operation related to the smart search operation. For example, when the change in the application is the update of the application, the processor 120 may perform an operation related to the update of the corresponding application.

According to an embodiment, in the example operation of FIG. 21, the operation of updating the smart search table is described as an example in which the application change is the installation or removal of the application, but the operation of updating the smart search table according to an embodiment of the disclosure is not limited thereto. According to an embodiment, the application change may include a configuration (or option) change related to the search function of the application, and the operation of updating the smart search table may be performed according to the change of the configuration (or option) related to the search function of the application.

According to an embodiment, as to the configuration (or option) of the designated application among the applications registered in the smart search table, a data policy may be changed so as not to perform interworking for the integrated search using the keypad by not storing data or registering data in an external server (e.g., the server 108 of FIG. 1). According to an embodiment, when identifying the data policy change of the designated application, the processor 120 may update the smart search table. For example, the processor 120 may change (e.g., configure not to provide the integrated search or remove the search function) at least one piece of information (e.g., configuration information related to the integrated search function) related to the application whose configuration (or option) is changed from the smart search table. According to an embodiment, the processor 120 may configure (e.g., cancel the search function) not to perform a search according to the corresponding application by changing the corresponding application information from the smart search table. According to an embodiment, when the configuration (or option) of the corresponding application is reactivated from the search function cancellation, the processor 120 may change the corresponding application information in the smart search table to perform a search by the corresponding application.

Figure 22:
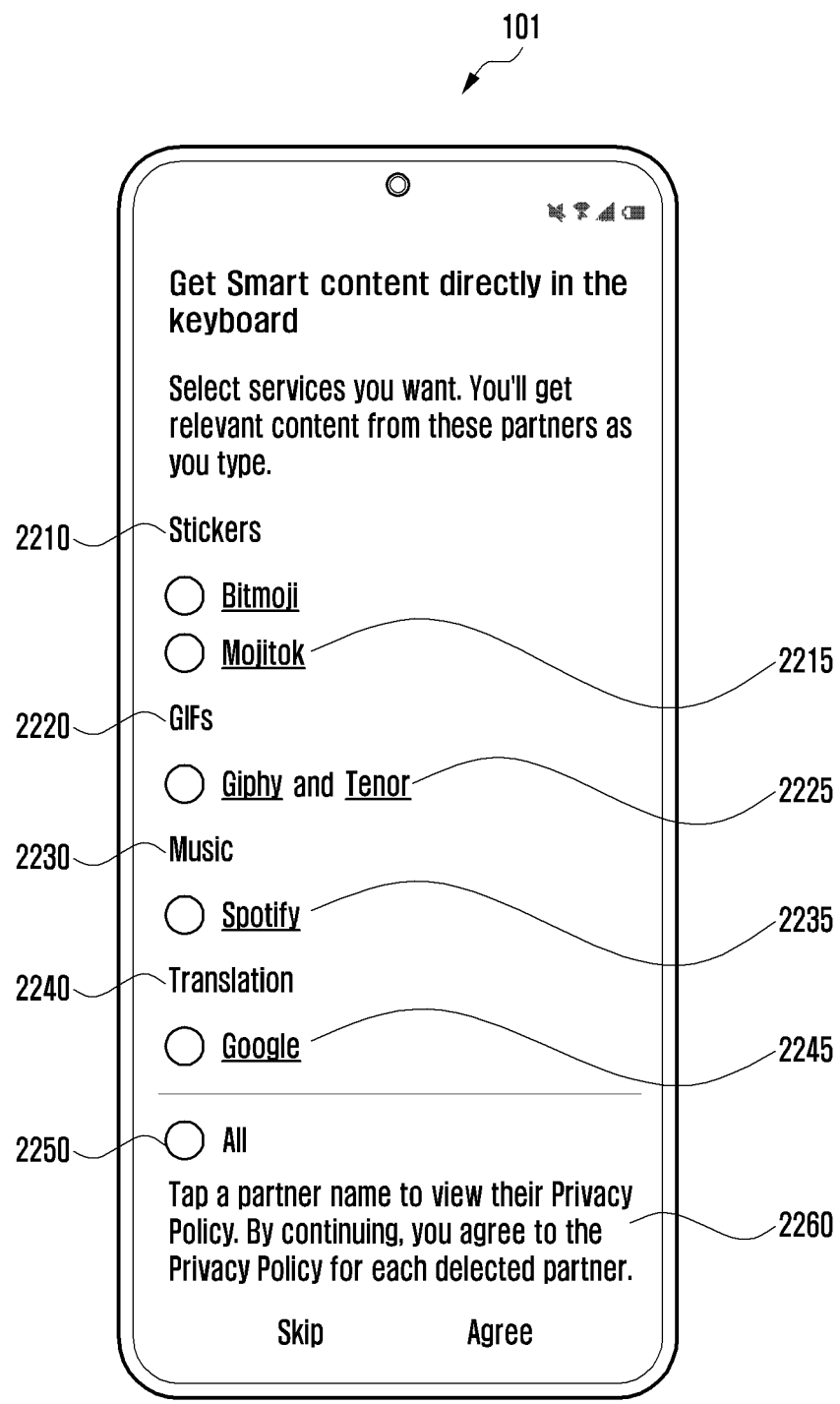
FIG. 22 is a diagram illustrating an example of configuring an application for a smart search in an electronic device according to various embodiments.

FIG. 22 is a diagram illustrating an example of configuring an application for a smart search in an electronic device according to various embodiments.

According to an embodiment, FIG. 22 illustrates an example of a configuration interface related to the smart search operation in the electronic device 101.

As shown in FIG. 22, the configuration interface may provide various types of interfaces to configure (e.g., activate or deactivate) categories 2210, 2220, 2230 and 2240 of content to be associated with the keypad for a smart search and applications 2215, 2225, 2235, and 2245 to be used for a content search in each category. For example, the configuration interface may include various options that configure categories and/or applications to be used for the smart search using the keypad by the user.

According to some embodiments, the configuration interface may include an option tab (e.g., all) 2250 that can designate all categories and/or applications that can be supported by the electronic device 101 at once. According to an embodiment, the configuration interface may provide a menu 2260 including information on a personal information protection regulation (general data protection regulation {GDPR}) guiding that personal information can be used at the time of the smart search configuration and an option to confirm consent thereto.

Figure 23A:
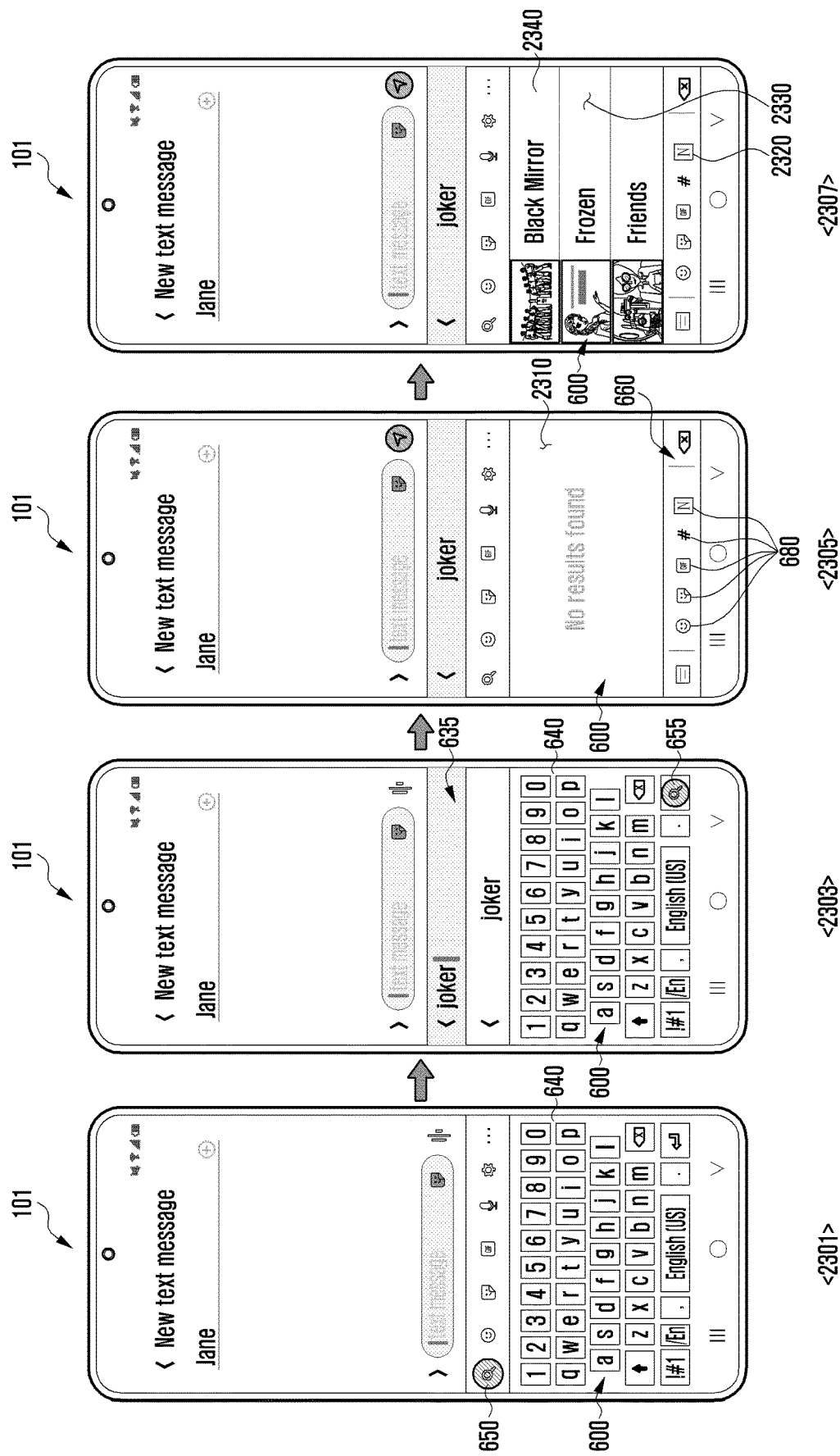

FIGS. 23A and 23B are diagrams illustrating an example of performing a search using a keypad of an electronic device and providing a result thereof according to various embodiments of the disclosure.

According to an embodiment, FIGS. 23A and 23B show an example operation of displaying the keypad 600 (e.g., the keypad 360 of FIG. 3 or 4) on at least a portion of the display 390, searching for content based on a search keyword input through the keypad 600, and providing the search result through the keypad 600.

Referring to FIGS. 23A and 23B, as shown in an example screen <2301>, the electronic device 101 may display the keypad 600 by overlapping at least a part of the keypad 600 on the execution screen displayed through the display 390, or may display the keypad 600 through an independent area (or window) distinguished from the execution screen.

According to an embodiment, a user may select a search object 650 to access (or enter) a smart search (or integrated search) mode. For example, when a user input (e.g., touch) is detected through the search object 650, the electronic device 101 may execute the smart search mode.

As shown in an example screen <2303>, the user may input a keyword (e.g., text) (e.g., "joker") related to a content search using a key button of the keypad 600. According to an embodiment, the electronic device 101 may display text (e.g., characters) corresponding to an input signal (e.g., a key button signal) input through the key map area 640 of the keypad 600 through the keyword area 635. For example, the electronic device 101 may display the text corresponding to the user's keyword input on the keyword area 635. According to some embodiments, the electronic device 101 may omit the keyword area 635 and may display the text corresponding to the keyword input using the input area 620.

According to an embodiment, when the user completes the keyword input (e.g., joker), the user may select the command execution button 655 (e.g., the smart search execution object) so that the electronic device 101 can perform a search related to the keyword. According to an embodiment, when a user input (e.g., touch) related to the search command execution is detected, the electronic device 101 may perform the operation of searching for content related to the keyword using each application.

As shown in an example screen <2305> or an example screen <2307>, the electronic device 101 may provide search results 2310 and 2330 of the content through at least a portion (e.g., at least a portion of the key map area 640) of the keypad 600. According to an embodiment, the electronic device 101 may remove at least a part of the key map of the keypad 600, and may replace and provide (e.g., display) an area where at least key map is provided with the content.

According to an embodiment, the electronic device 101 may provide the objects 680 corresponding to the categories (e.g., representative icons indicating the categories and/or representative icons indicating the applications) in a partial areas (e.g., the category area 660) of the keypad 600.

According to an embodiment, the example screen <2305> illustrates an example of a case in which the content of the corresponding category is not found (or does not exist). For example, when the content by a designated keyword is not found in a designated category (or designated application), an example of providing the search result 2310 (or the result screen) (e.g., "No results found") at the time of activating the corresponding object is illustrated.

According to an embodiment, the example screen <2307> illustrates an example of a case in which the content of the corresponding category is found as the search result of the content. For example, when the content corresponding to the designated keyword is found in the designated category (or designated application), an example of providing the search result 2330 (e.g., an object {e.g., image, video, text, icon, and/or link} related to the content) at the time of activating each corresponding object (e.g., the object 2320 of the example screen <2307>) is shown. According to an embodiment, the electronic device 101 may provide the search result 2330 (e.g., the search content) in the form of a scrollable list through the object (e.g., tab) for each category (or application) provided through the keypad 600.

According to an embodiment, as shown in the example screen <2307>, the electronic device 101 may perform the operation of transmitting and sharing the content (e.g., the content 2340) selected based on a user input in a state in which the search result 2330 of the content is displayed through the keypad 600. For example, as shown in the example screen <2309>, when an attribute of an object of a point (or position or area) where the user input is detected from the search result 2330 (e.g., list) displayed through the keypad 600 is, for example, a first object 2340 (e.g., the content itself), the electronic device 101 may process the task of transmitting and sharing the selected content. According to an embodiment, based on the user input of selecting (e.g., touch) arbitrary content 2340 in the search result 2330, the electronic device 101 may input at least a part of shared information 2360 related to the content or all thereof to the input area 620 to provide (or display or insert) the input information as shown in the example screen <2311>. According to an embodiment, the electronic device 101 may insert shared information of a corresponding format (e.g., image type and/or text type) to the input area 620 according to the attribute of the content. According to an embodiment, as shown in the example screen <2311>, the electronic device 101 may detect a user input in which a transmission object 2370 for sharing the content is selected (e.g., touched) while the shared information 2360 is displayed through the input area 620.

According to an embodiment, when the user input is detected by the transmission object 2370 while the shared information 2360 (e.g., at least a part of shared information) is input to the input area 620, the electronic device 101 may provide (e.g., display) the shared information 2380 (e.g., entire shared information or processed shared information) to an execution screen (e.g., chatting screen or message screen) displayed through the display so that the corresponding content may be shared with another electronic device (or another user) as shown in the example screen <2313>. According to an embodiment, the electronic device 101 may maintain the display state of the search result 2330 through the keypad 600 while performing the operation of sharing the content.

According to an embodiment, as shown in the example screen <2309>, in the state of displaying the search result 2330 of the content through the keypad 600 or the state of displaying the shared information 2380 as shown in the example screen <2313>, the electronic device 101 may perform an operation of executing and displaying the content selected based on the user input.

According to an embodiment, as shown in the example screen <2309>, when the attribute of the object corresponding to the point (e.g., position or area) where the user input is detected from the search result 2330 displayed through the keypad 600 is, for example, the second object 2350 (e.g., the button object for performing the next operation), the electronic device 101 may process a task of executing the selected content. According to an embodiment, as shown in the example screen <2313>, when the user input is detected in the shared information 2380 displayed on the execution screen, the electronic device 101 may process a task of executing the content of the shared information 2380. According to an embodiment, the electronic device 101 may identify and execute the application capable of the corresponding content (e.g., the selected content) according to the attribute of the content based on the user input. For example, the electronic device 101 may execute the application capable of executing (e.g., reproducing) the content, and may execute the content based on the executed application.

As shown in the example screen <2315>, the electronic device 101 may display the execution screen 2390 (e.g., the execution screen of the application in which the content is executed) related to the content through the display 390 based on the application execution. According to an embodiment, the electronic device 101 may remove the display of the keypad 600 from the display 390, and may provide the execution screen 2390 including the content based on the application execution through the display.

According to an embodiment, the electronic device 101 may display the execution screen 2390 including the content by overlapping at least a part of the execution screen 2390 based on the execution of the application in a state in which the keypad 600 displayed through the display 390 is maintained, or may provide the execution screen 2390 through an independent area (or window) distinguished from the keypad 600.

As shown in the examples of FIGS. 23A and 23B, according to an embodiments, the electronic device 101 may share the shared information (e.g., link) of the corresponding content when the searched content is selected by the user, or may execute the corresponding content to directly reproduce the same.

FIG. 24 is a diagram illustrating another example of performing a search using a keypad of an electronic device and providing a result thereof according to various embodiments.

According to an embodiment, FIG. 24 illustrates an example in which the content of an Internet of Things (IoT) device is searched, analyzed, and provided (e.g., displayed) in the electronic device 101.

Referring to FIG. 24, as shown in the example screen <2401>, the electronic device 101 may input and display a keyword (e.g., air conditioner) corresponding to the keyword area 635 and the input area 620 in response to a user's keyword input (e.g., air conditioner) using the keypad 600. According to an embodiment, the electronic device 101 may provide a keyword (e.g., text) input by the user through the keyword area 635, so that the user can confirm what the content is to be searched. According to some embodiments, in response to the user's input of the keyword, the electronic device 101 may provide a predicted keyword or a related keyword (e.g., air conditioner humidity or air conditioner temperature) to an upper area 2410 (e.g., additional information area) of the input area 620. According to an embodiment, the upper area 2410 (e.g., additional information area) may be provided by overlapping the display area (or execution screen of an application). According to an embodiment, the upper area 2410 may include the keyword predicted or associated with the user's keyword, and may be provided based at least on text, images, and/or icons.

According to an embodiment, when the user input related to execution of a search command is detected, the electronic device 101 may perform an operation of searching for content related to the keyword using the corresponding application. According to an embodiment, as shown in the example screen <2403>, while the electronic device 101 is performing a content search based on the corresponding application, the electronic device 101 may display status information 2420 indicating the content search progress state through the keypad 600. According to an embodiment, while the content search is being performed, the electronic device 101 may display the object 2450 (e.g., a cancellation button) related to a search cancellation together with the status information 2420 indicating the content search progress state through the display 390. For example, when the user input (e.g., touch) is detected through the object related to the search cancellation, the processor 120 may cancel the ongoing search operation. According to an embodiment, as illustrated in the example screen <2403> and the example screen <2405>, the electronic device 101 may omit or maintain the keyword area 635 while proceeding with the content search or providing the result screen 2430.

According to an embodiment, when the search is completed, the electronic device 101 may provide the search result 2430 of the content through at least a portion of the keypad 600 as shown in the example screen <2405>. For example, when the smart search is performed by a designated keyword (e.g., air conditioner) at a designated location (e.g., home), the electronic device 101 may search for the content (e.g., information related to the air conditioner) related to the keyword by interworking with a designated application (e.g., the application of the air conditioner), and may provide the search result to the user through the keypad 600. For example, as illustrated in the example screen <2405>, the electronic device 101 may provide air conditioner control information and sensing information (e.g., temperature information) according to the operation of the air conditioner through the keypad 600.

FIG. 25 is a diagram illustrating another example of performing a search using a keypad of an electronic device and a result thereof according to various embodiments of the disclosure.

According to an embodiment, FIG. 25 illustrates an example of searching, analyzing, and providing (e.g., displaying) content of IoT devices in the electronic device 101.

Referring to FIG. 25, as shown in an example screen <2501>, the electronic device 101 may input and display a keyword (e.g., IoT) corresponding to the keyword area 635 and/or the input area 620 in response to a user's input of the keyword (e.g., IoT) using the keypad 600. According to an embodiment, the electronic device 101 may provide a keyword (e.g., text) input by the user through the keyword area 635 so that the user can check what content is to be searched. According to some embodiments, in response to the user's keyword input, the electronic device 101 may display a predicted keyword or a related keyword (e.g., IOT SAMSUNG) in the upper area 2510 (e.g., additional information area) of the input area 620. According to an embodiment, the upper area 2510 (e.g., the additional information area) may be provided by overlapping the display area (or an execution screen of an application). According to an embodiment, the upper area 2510 may include keywords predicted or associated with the user's keywords, and may be provided based at least on text, images, and/or icons.

According to an embodiment, when the user input related to execution of the search command is detected, the electronic device 101 may perform an operation of searching for content related to the keyword using the corresponding application. According to an embodiment, as shown in the example screen <2503>, while the electronic device 101 is performing a content search based on the corresponding application, the electronic device 101 may display status information 2520 indicating a content search progress state through the keypad 600. According to an embodiment, while the content search is being performed, the electronic device 101 may display the object 2450 (e.g., a cancellation button) related to canceling a search together with status information 2520 indicating the content search progress state through the display 390. For example, when the user input (e.g., touch) is detected through the object related to the search cancellation, the processor 120 may cancel the ongoing search operation. According to some embodiments, as illustrated in the example screen <2503> and the example screen <2505>, the electronic device 101 may omit or maintain the keyword area 635 while proceeding with the content search or providing a result screen 2530.

According to an embodiment, when the search is completed, the electronic device 101 may provide the search result 2530 of the content through at least a portion of the keypad 600 as shown in the example screen <2505>. For example, when a smart search is performed by a designated keyword (e.g., IoT) at a designated location (e.g., home), the electronic device 101 may interwork with designated application (e.g., Smart Things applications) and may search for content (e.g., device information related to IoT) related to the keyword to provide the searched content to the user through the keypad 600. For example, as illustrated in the example screen <2505>, the electronic device 101 may provide device information related to a peripheral device related to IoT around the electronic device 101 through the keypad 600.

According to various embodiments, as illustrated in FIGS. 24 and/or 25, the electronic device 101 may provide a smart search further considering position information (e.g., designated place or space), time information, and/or context information (e.g., context-aware information) of the electronic device 101. According to another embodiment, the electronic device 101 may search, analyze, and provide (e.g., display) content in a vehicle. For example, the electronic device 101 may identify a situation in which the user is in a vehicle based on TPO (time, place, occasion), and when a smart search operation is performed, the electronic device 101 may raise the priority of the search result to the content, such as user's favorite music and/or map information (e.g., navigation information) in the vehicle, to recommend the obtained information to the user.

The electronic device 101 according to various embodiments disclosed in this document has a bar-type or plate-type appearance, but the disclosure is not limited thereto. For example, the illustrated electronic device 101 may be a part of a rollable electronic device or a foldable electronic device. The "rollable electronic device" may refer to an electronic device capable of bending deformation of a display (e.g., the display 390 in FIG. 3), so that at least a portion of the electronic device may be wound or rolled or accommodated in a housing (not shown). Depending on the needs of the user, the rollable electronic device may expand and use the screen display area by unfolding the display or exposing a larger area of the display to the outside. The "foldable electronic device" may refer to an electronic device that can be folded substantially facing two different areas of a display (e.g., the display 390 of FIG. 3) or in a direction opposite to each other. In general, in the foldable electronic device in a portable state, the display may be folded in a state in which two different areas face each other or in an opposite direction, and in an actual use state, a user may unfold the display (e.g., the display 390 in FIG. 3) so that the two different areas can be formed of a substantially flat plate shape.

An operation method performed in the electronic device 101 according to an embodiment of the disclosure may include: displaying an execution screen of an application; detecting a first input for calling a keypad 600 (e.g., the keypad 360 of FIG. 3); displaying the keypad on the execution screen; detecting a second input for a smart search while displaying the keypad; requesting a content search from at least one application of the electronic device 101; and displaying a search result searched by the at least one application through the keypad 600.

According to an embodiment of the disclosure, the displaying of the keypad 600 may include calling the keypad 600 based on the detecting of the first input while displaying the execution screen; and controlling a display 390 (e.g., the display module 160 of FIG. 1) of the electronic device 101 to display the keypad 600 in at least a partial area on the execution screen.

According to an embodiment of the disclosure, the performing of the integrated search may include receiving a keyword and a search command as the second input while displaying the keypad 600 through the display 390; performing the content search in a plurality of applications based on the keyword; and acquiring the search result from at least one application in the plurality of applications.

According to an embodiment of the disclosure, the operation method may further include removing at least a portion of a key map of the keypad 600 and converting an area corresponding to the part of the key map into a view area for a content display.

According to an embodiment of the disclosure, the displaying of the search result may include classifying the search results by the at least one application into different categories; and providing one or more object corresponding to the categories and content for each of the one or more objects through the keypad 600.

According to an embodiment of the disclosure, the displaying of the search result may include providing the search result in a form of a scrollable list for each of the one or more objects.

According to an embodiment of the disclosure, the operation method may further include receiving a third input from the search result corresponding to a designated object activated through the keypad 600; and processing a task related to execution of the content based on the third input.

According to an embodiment of the disclosure, the task may include processing a first task of transmitting and sharing the content to another electronic device based on the third input that is first designated; and processing a second task of executing the content in the electronic device 101 based on the third input that is second designated.

Various embodiments of the disclosure disclosed in the specification and drawings are only provided for specific examples to easily describe the technical content of the disclosure and to aid understanding of the disclosure, and are not intended to limit the scope of the disclosure. Therefore, the scope of the disclosure should be construed that all changes or modified forms derived based on the technical idea of the disclosure in addition to the embodiments disclosed herein are included in the scope of the disclosure.

The invention claimed is:

1. An electronic device comprising:
a display;
a wireless communication circuit;
a memory; and
a processor configured to be operatively connected to the display, the wireless communication circuit, and the memory,
wherein the processor is configured to:
display an execution screen of an application, the execution screen including a first text input field;
detect a first input requesting display of a keypad;
display the keypad on the execution screen;
detect a second input requesting execution of an in-keypad search while displaying the keypad;
in response to the second input, display on the display a second text input field for the in-keypad search, separately from continued display of the first text input field;
request, based on text input into the second text input field, a content search from at least one application of the electronic device; and
display a search result of a search executed by the at least one application through the keypad,
wherein the processor is further configured to:
based on detecting a change in applications installed in the electronic device, determine whether a new application is installed or whether the at least one application is removed;
when the new application is installed:
based on determining that the new application supports the in-keypad search, identify at least one category of searchable content supported by the new application;
update a smart search table to indicate the new application supports the in-keypad search for searching within the identified at least one category of searchable content; and
when the at least one application is removed, delete information related to the at least one application from the smart search table.

2. The electronic device of claim 1, wherein the processor is configured to:
call the keypad based on the detecting of the first input while displaying the execution screen; and
control the display to display the keypad in at least a partial area of the execution screen, wherein the second input requesting execution of the in-keypad search is received prior to entry of any text into the first text input field.

3. The electronic device of claim 1, wherein the processor is configured to:
receive a keyword and a search command as the second input while displaying the keypad through the display; and control a plurality of applications to perform the content search based on the keyword.

4. The electronic device of claim 3, wherein the processor is configured to:
acquire the search result from the at least one application among the plurality of applications; and
provide the acquired search result to the keypad.

5. The electronic device of claim 3, wherein the processor is configured to:
remove at least a part of a key map of the keypad and convert an area corresponding to the part of the key map into a view area for a content display.

6. The electronic device of claim 1, wherein the processor is configured to:
classify the search result by the at least one application into different categories; and
provide one or more objects corresponding to the categories and content for each of the one or more objects through the keypad.

7. The electronic device of claim 6, wherein the processor is configured to provide the search result in a form of a scrollable list for each of the one or more objects.

8. The electronic device of claim 7, wherein the processor is configured to:
receive a third input from the search result corresponding to a designated object activated through the keypad; and
process a task related to execution of the content based on the third input.

9. The electronic device of claim 8, wherein the processor is configured to:
processing a first task of transmitting and sharing the content to another electronic device based on the third input that is first designated; and
processing a second task of executing the content in the electronic device based on the third input that is second designated.

10. The electronic device of claim 1, wherein the processor is configured to:
provide an integrated search of content for the applications installed in the electronic device, using a learning model trained using an artificial intelligence algorithm.

11. The electronic device of claim 1, wherein the processor is configured to:
display the keypad on the display;
predict a plurality of applications for an integrated search of the electronic device based on a keyword input through the keypad;
perform an integrated search of content according to the keyword based on the predicted plurality of applications; and
provide the search result through the keypad.

12. A method of operating an electronic device, the method comprising:
displaying, via a display, an execution screen of an application, the execution screen including a first text input field;
detecting, via input circuitry, a first input requesting display of a keypad;
displaying, via the display, the keypad on the execution screen;
detecting, via the input circuitry, a second input requesting execution of an in-keypad search while displaying the keypad;

in response to the second input, displaying, via the display, a second text input field for the in-keypad search, separately from continued display of the first text input field;

requesting, based on text input into the second text input field, a content search from at least one application of the electronic device;

display a search result of a search executed by the at least one application through the keypad;

based on detecting a change in applications installed in the electronic device, determining whether a new application is installed or whether the at least one application is removed;

when the new application is installed:
  based on determining that the new application supports the in-keypad search, identifying at least one category of searchable content supported by the new application;
  updating a smart search table to indicate the new application supports the in-keypad search for searching within the identified at least one category of searchable; and when the at least one application is removed, deleting information related to the at least one application from the smart search table.

13. The method of claim 12, further comprising:

calling the keypad based on the detecting of the first input while displaying the execution screen;

controlling the display of the electronic device to display the keypad in at least a partial area of the execution screen;

receiving a keyword and a search command as the second input while displaying the keypad through the display;

performing the content search in a plurality of applications based on the keyword; and acquiring the search result from the at least one application among the plurality of applications, wherein the second input requesting execution of the in-keypad search is received prior to entry of any text into the first text input field.

14. The method of claim 13, wherein the displaying of the keypad further comprises:

removing at least a part of a key map of the keypad; and converting an area corresponding to the part of the key map into a view area for a content display.

15. The method of claim 13, wherein the displaying of the search result further comprises:

classifying the search result by the at least one application into different categories;

providing one or more objects corresponding to the categories and content for each of the one or more objects through the keypad;

receiving a third input from the search result corresponding to a designated object activated through the keypad; and processing a task related to execution of the content based on the third input, wherein the processing of the task comprises:
  processing a first task of transmitting and sharing the content to another electronic device based on the third input that is first designated; and
  processing a second task of executing the content in the electronic device based on the third input that is second designated.

* * * * *